United States Patent
Ohta

(10) Patent No.: US 7,616,253 B2
(45) Date of Patent: Nov. 10, 2009

(54) OPTICAL APPARATUS

(75) Inventor: Seiya Ohta, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 455 days.

(21) Appl. No.: 11/564,032

(22) Filed: Nov. 28, 2006

(65) Prior Publication Data
US 2007/0126917 A1 Jun. 7, 2007

(30) Foreign Application Priority Data
Nov. 28, 2005 (JP) .............................. 2005-341922

(51) Int. Cl.
 H04N 5/232 (2006.01)
 G03B 13/00 (2006.01)
(52) U.S. Cl. ..................................... 348/345; 348/349
(58) Field of Classification Search ................. 348/345, 348/349
See application file for complete search history.

(56) References Cited

U.S. PATENT DOCUMENTS

| 5,638,122 | A * | 6/1997 | Kawaguchi et al. | 348/349 |
| 6,430,368 | B1 * | 8/2002 | Hata | 396/79 |
| 7,110,035 | B1 | 9/2006 | Hellstrand | |
| 2004/0119871 | A1 | 6/2004 | Nobuoka | |
| 2005/0157198 | A1 * | 7/2005 | Larner et al. | 348/345 |

FOREIGN PATENT DOCUMENTS

| CN | 1357113 A | 7/2002 |
| EP | 0 092 850 | 11/1983 |
| EP | 0 794 660 | 9/1997 |
| JP | H02-140074 | 5/1990 |
| WO | 00/72075 | 11/2000 |

OTHER PUBLICATIONS

Je-Ho Lee et al: "Implementation of a Passive Automatic Focusing Algorithm for Digital Still Camera", IEEE Transactions on Consumer Electronics, IEEE Service Center, New York, NY, US, vol. 41, No. 3, Aug. 1, 1995, pp. 449-454.
Communication concerning application No. 06023919.1-2202 from the European Patent Office dated Oct. 4, 2007 including extended European Search report.
Chinese Office Action concerning Application No. 200610162564.0 dated May 23, 2008 and translation thereof.

* cited by examiner

Primary Examiner—Lin Ye
Assistant Examiner—Leslie Virany
(74) Attorney, Agent, or Firm—Rossi, Kimms & McDowell, LLP

(57) ABSTRACT

An optical apparatus is disclosed which achieves high focusing accuracy and favorable responsiveness in AF control. The apparatus includes a signal generator which extracts signals in a plurality of frequency bands from an output from an image-pickup part and generates focus signals from the extracted signals, and a controller which performs focus control such that the focus signal approaches the highest value. The controller uses a first focus signal and a second focus signal in the focus control. The second focus signal is a synthesis signal formed by synthesizing a focus signal in a relatively high or the highest frequency band of the plurality of frequency bands and a focus signal in another frequency band and contains a component of the focus signal in the relatively high or highest frequency band at a higher ratio as compared with the first focus signal.

5 Claims, 16 Drawing Sheets

OPTICAL APPARATUS

BACKGROUND OF THE INVENTION

The present invention relates to a technique of auto-focus (AF) control in an optical apparatus such as a video camera, a digital still camera, and an interchangeable lens apparatus.

An AF function provided for optical apparatuses is realized by generating a focus signal (hereinafter referred to as an AF evaluation value signal) representing the sharpness of video image from a video signal generated by an image-pickup part including an image-pickup element and then controlling drive of a focus lens such that the AF evaluation value signal is at the maximum. Such an AF method is called a contrast AF method or a TV-AF method.

The AF evaluation value signal is typically generated on the basis of high-frequency components extracted from the video signal through a band-pass filter (BPF). When an image is blurred, the high-frequency components, that is, the AF evaluation value signal is at a low level. As the image is brought into an in-focus state, the level of the AF evaluation value signal becomes higher. When an in-focus point is reached, the AF evaluation value signal is at the highest level. The characteristic of the AF evaluation value signal can be used to perform accurate control of drive of the focus lens (focus control, also referred to as AF control).

In actual AF control, when the AF evaluation value signal is at a low level, the focus lens is driven as fast as possible in a direction in which the level thereof is increased (also referred to as mountain-climbing drive), and as the level of the AF evaluation value signal becomes higher, the focus control is performed at a lower speed. In addition, to determine the direction in which the level of the AF evaluation value signal is increased, that is, the direction in which the focus lens is driven, the focus lens is minutely driven (minute-drive) and the change in the AF evaluation value signal during the minute-drive is monitored (see Japanese Patent Laid-Open No. H02 (1990)-140074). This allows the focus lens to be moved to the in-focus point in a short time.

In recent years, a higher magnification of an image-pickup lens, and an increased number and a higher density of pixels of an image-pickup element have promoted the use of cameras capable of picking up images with a higher degree of definition (resolution) as in a high-definition TV system (hereinafter referred to as a high-definition system) as well as a standard TV system such as NTSC and PAL. For picking up images in the high-definition system, the AF control can also be performed by using the above mentioned AF evaluation value signal.

In the camera capable of picking up images in the high-definition system, however, the following problems occur when the AF control is performed by using the AF evaluation value signal in the same frequency band as that in the standard TV system.

FIG. 11A shows a comparison between a resolution spatial frequency in picking up images with the standard TV system (the NTSC system is used in this case) and a resolution spatial frequency in picking up images by using a higher number and a higher density of pixels with the high-definition system. In FIG. 11A, 'NTSC' (Hz) represents the resolution spatial frequency in the NTSC image pickup, while 'HD' (Hz) represents the resolution spatial frequency in the high-definition image pickup. The 'HD' (Hz) is higher than the 'NTSC' (Hz).

Each of the resolution spatial frequencies in this case is not a resolvable limit of frequency but a spatial frequency with a sufficiently high MTF as indicated by arrows in FIG. 11A. Typically, an adequate MTF can be provided by setting approximately 80% of the resolvable limit of spatial frequency.

With the difference in the resolution spatial frequency, it is possible that the AF evaluation value signal in the 'NTSC' (Hz) is used for AF control in the high-definition image pickup but focus cannot be achieved. This is because the highest level of the AF evaluation value signal cannot be detected for an object image in the 'HD' (Hz).

FIG. 11B shows an example in which in-focus detection is performed with the AF evaluation value signals of the 'NTSC' (Hz) and 'HD' (Hz). A curve with 'low extraction frequency' represents the AF evaluation value signal in the 'NTSC' (Hz), while a curve with 'high extraction frequency' represents the AF evaluation value signal in the 'HD' (Hz).

The AF evaluation value signal in the 'NTSC' (Hz) has the shape of a gentle hill and the AF evaluation value signal in the 'HD' (Hz) has the shape of a steep hill. FIG. 11B also shows in-focus accuracy necessary for the NTSC image pickup as $\Delta$NTSC and in-focus accuracy necessary for the high-definition image pickup as $\Delta$HD. Since the peaks of both of the AF evaluation value signals fall within the ranges of $\Delta$NTSC and $\Delta$HD needed in the associated image-pickup systems, favorable in-focus accuracy can be provided in each of the image-pickup systems. However, if the AF evaluation value signal in the 'NTSC' (Hz) is used in the high-definition image pickup, satisfactory in-focus accuracy may not be realized since the $\Delta$NTSC range is wider than the $\Delta$HD range.

To address this, it is contemplated as shown in FIG. 11C that the AF evaluation value signal in the 'NTSC' (Hz) can be added to the AF evaluation value signal in the 'HD' (Hz) (that is, they are synthesized) to ensure in-focus accuracy in the high-definition image pickup.

However, constantly adding the AF evaluation value signal in the 'NTSC' (Hz) to the AF evaluation value signal in the 'HD' (Hz) during AF control may not result in favorable AF performance.

When images are actually picked up, a minor subject such as a background often exists in a frame other than a major subject. If the focus lens is moved to the front or back of the in-focus point for the major subject, the AF evaluation value signal is not simply increased or reduced as shown in FIG. 11C in many cases.

FIG. 12A shows an example in which a person as a major subject exists at the center of a frame, a mountain as a background exists behind the person, and an object exists in front of the person. FIG. 12B shows changes in an AF evaluation value signal for high definition (a high extraction frequency) and an AF evaluation value signal for NTSC (a low extraction frequency) at various positions of a focus lens. In this case, in comparison with the AF evaluation value signal for NTSC, the AF evaluation value signal for high definition has steep hills due to the effects of the background and the object in front of the person.

When these AF evaluation value signals are always synthesized in AF control, the synthesis AF evaluation value signal has two peaks on both sides of the peak corresponding to the major subject (on the closest side and infinity side) as shown in FIG. 12C. If the focus lens is driven, for example from the closest end or infinity end in AF control using the synthesis AF evaluation value signal, the focus lens is stopped at the peak for the background or the object in front of the person, not at the peak for the major subject which should be focused on. This reduces the responsiveness in AF.

When a small or a fine subject is included in the background, the AF evaluation value signal for the background is likely to be at a higher level. Particularly, the AF evaluation value signal in a high frequency band to realize in-focus accuracy for high-definition images tends to have a higher level.

For example, when many trees form a background to produce a higher frequency band as shown in FIG. 13A, the level of the AF evaluation value signal for the background is higher than the level of the AF evaluation value signal for the major subject in the high frequency band for high-definition images as shown in FIG. 13B. If these AF evaluation value signals are always synthesized in AF control, the highest mountain is formed at the focus point corresponding to the trees as the background in the synthesis AF evaluation value signal as shown in FIG. 13C. In this case, the background is more likely to be brought into focus than the major subject to cause so-called near and far subjects in the frame.

In this manner, only the AF evaluation value signal in the low frequency band for the NTSC system cannot provide in-focus accuracy suitable for the high-definition system. In addition, simply synthesizing the AF evaluation value signal for the high-definition system and the AF evaluation value signal for the NTSC system to provide in-focus accuracy necessary for the high definition may make it difficult to focus on the major subject to reduce the responsiveness.

BRIEF SUMMARY OF THE INVENTION

The present invention provides an optical apparatus which can provide both of high in-focus accuracy and favorable responsiveness in AF control when images are picked up with a higher resolution in the high-definition system or the like than in conventional image-pickup systems, and a focus control method for use in the optical apparatus.

According to an aspect, the present invention provides an optical apparatus (a method of controlling focus) includes a signal generator (a signal generating step) which extracts signals in a plurality of frequency bands from an output from an image-pickup part and generates focus signals from the signals, and a controller (a control step) which performs focus control such that the focus signal approaches the highest value. The controller (the control step) uses a first focus signal and a second focus signal in the focus control. Each of the first and second focus signals is a synthesis signal formed by synthesizing at least two of the focus signals in the plurality of frequency bands, and the second focus signal contains a component of a focus signal in a first frequency band at a higher ratio as compared with the first focus signal, the first frequency band being relatively high in the plurality of frequency bands.

According to another aspect, the present invent-on provides an optical apparatus (a method of controlling focus) including a signal generator (a signal generating step) which extracts signals in a plurality of frequency bands from an output from an image-pickup part and generates a focus signal from at least one of the signals, and a controller (a control step) which performs focus control such that the focus signal approaches the highest value. The controller (the control step) uses a first focus signal and a second focus signal in the focus control. The second focus signals is a synthesis signal formed by synthesizing a focus signal in a first frequency band which is the highest of the plurality of frequency bands and a focus signal in another frequency band and contains a component of the focus signal in the first frequency band at a higher ratio as compared with the first focus signal.

DETAILED DESCRIPTION OF THE PREFERRED EMBODIMENTS

Preferred embodiments of the present invention will hereinafter be described with reference to the drawings.

Embodiment 1

In Embodiment 1, an AF evaluation value signal in a high frequency band as a high-definition frequency band and an AF evaluation value signal in a low frequency band as an NTSC frequency band are synthesized (added) to provide a synthesis AF evaluation value signal for use in AF control. However, the synthesis which accentuates the characteristic of the AF evaluation value signal in the high frequency band is not always performed during AF control but is performed after a focusing operation to near an in-focus point using the AF evaluation value signal in the low frequency band, thereby achieving focusing with higher accuracy.

Figure 12A:
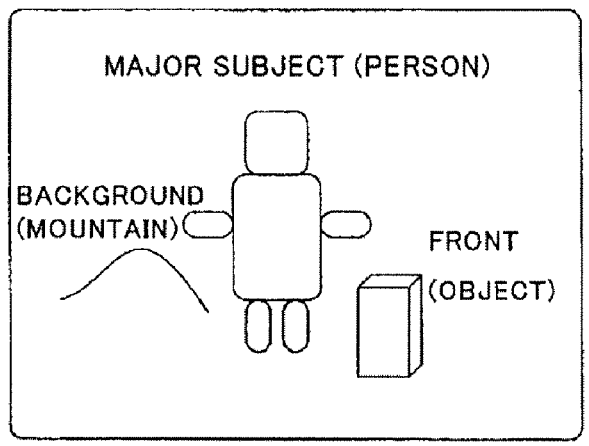
FIGS. 12A to 12D are explanatory views showing a relationship between subjects in a frame and the associated AF evaluation value signals.
Figure 12B:
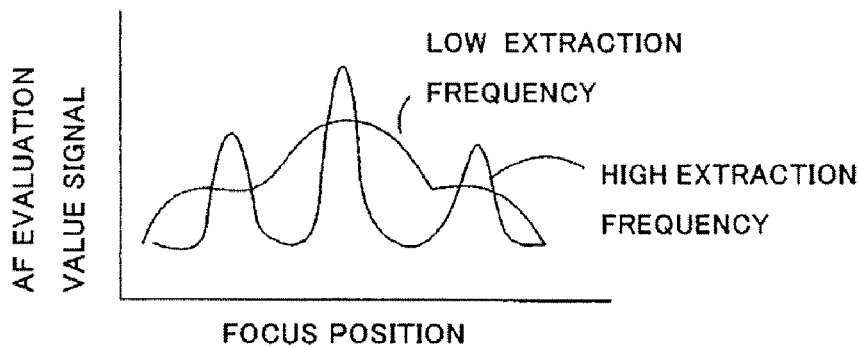
Figure 12C:
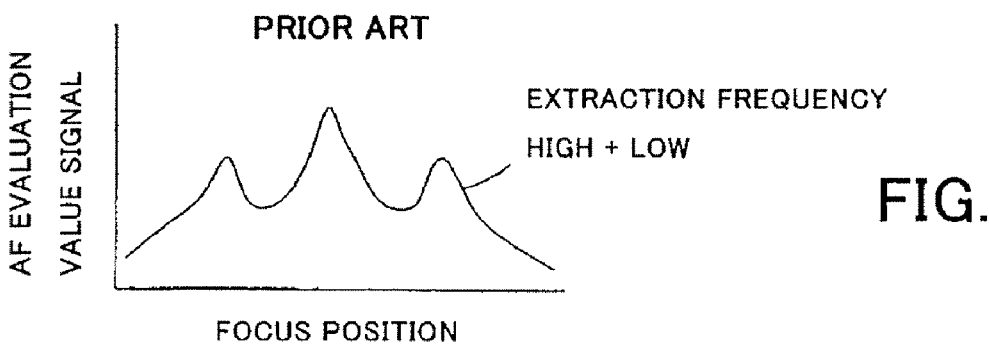

First, the general outlines of Embodiment 1 will be described with reference to FIGS. 12A to 12D, 13A to 13D, and 10A. As described above, FIGS. 12A and 13A show the examples in which the person as the major subject is at the center of the frame, the mountain and trees are behind the person as the background, respectively, and the object is in front of the person. FIGS. 12B and 13B show the changes in the AF evaluation value signal in the high-definition frequency band (high extraction frequency) and the AF evaluation value signal in the NTSC frequency band (low extraction frequency) at various positions of the focus lens in FIGS. 12A and 13A, respectively. FIGS. 12C and 13C show the synthesis AF evaluation signals provided by adding (synthesizing) the above mentioned AF evaluation signals obtained in the cases shown in FIGS. 12A and 13A, respectively.

While the high-definition frequency band and the NTSC frequency band are used as the high extraction frequency and the low extraction frequency, respectively, they are merely illustrative and the extraction frequencies are not limited to the high-definition frequency band and the NTSC frequency band. For example, the frequency band in the PAL system may be used as the low extraction frequency.

In Embodiment 1, we first note the AF evaluation value signals in the NTSC frequency band shown in FIGS. 12B and 13B and call this a viewpoint A. The AF evaluation value signal in the low NTSC frequency band is characterized in that it cannot provide in-focus accuracy for the high-definition image pickup but it has an excellent ability to detect a major subject.

As seen from FIGS. 12B and 13B, the AF evaluation value signal in the NTSC frequency band is gently changed for the background and the object in front of the person and is at the highest level near the in-focus point for the major subject. Thus, when an AF operation is performed from the closest end or infinity end, the focus lens can be moved smoothly to near the in-focus point for the major subject. In other words, the excellent ability to detect the major subject allows the AF operation to be performed to near the in-focus point for the major subject with high responsiveness even when the focus lens is located at a position away from the in-focus point as the closest end or infinity end.

Next, we pay attention on the AF evaluation value signal in the high-definition frequency band and call this a viewpoint B. As shown in FIGS. 12B and 13B, the AF evaluation value signal in the high-definition frequency band is abruptly changed for the background, the person, and the object in front of the person. The AF evaluation value signal can be used to provide AF accuracy necessary for the high-definition image pickup.

Then, we consider the combination of the viewpoint A with the viewpoint B and call this a viewpoint C. In Embodiment 1, as the first step of AF control, the highest level of the AF evaluation value signal for the major subject is detected by using the AF evaluation value signal in the NTSC frequency band. It is also possible to add (synthesize) the AF evaluation value signal in the high-definition frequency band at a low ratio to the AF evaluation value signal in the NTSC frequency band and use the synthesis AF evaluation value signal in the first step.

Next, as the second step of the AF control, the AF evaluation value signal in the high-definition frequency band is added (synthesized) at a high ratio to the AF evaluation value signal in the NTCS frequency band and the synthesis AF evaluation value signal is used to perform the AF control.

Figure 12D:
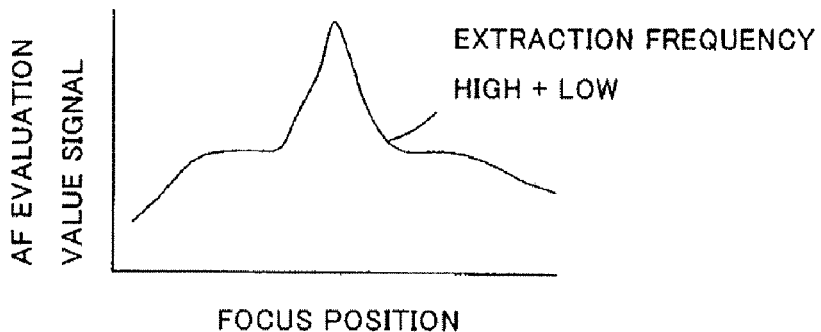
Figure 13A:
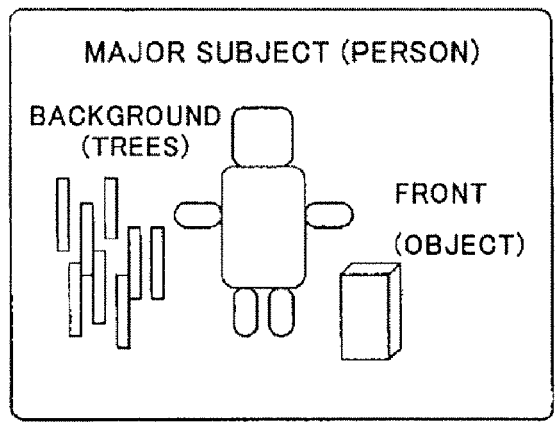
FIGS. 13A to 13D are explanatory views showing a relationship between subjects in a frame and the associated AF evaluation value signals.
Figure 13B:
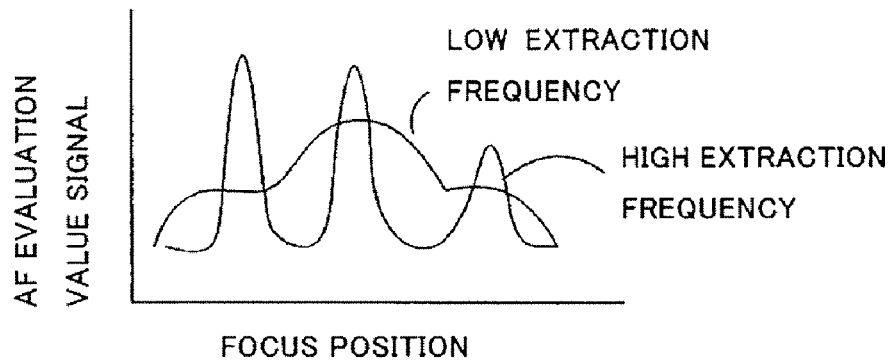
Figure 13C:
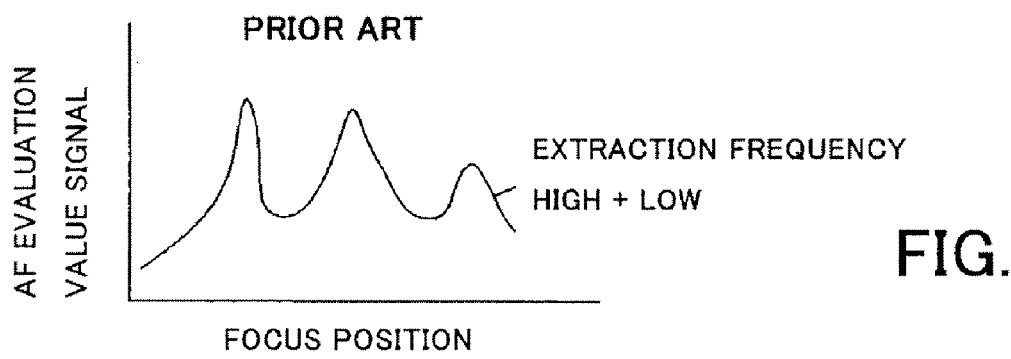
Figure 13D:
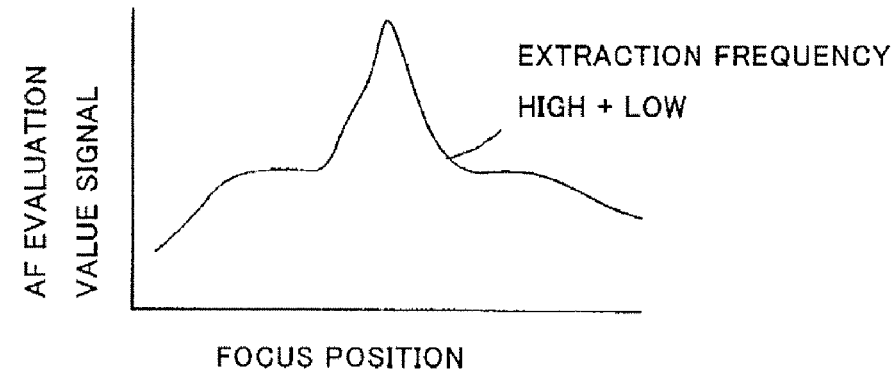

FIGS. 12D and 13D show the synthesis AF evaluation value signals used in the second step shown in the above mentioned viewpoint C. Since each of the synthesis AF evaluation signals is generated only near the in-focus point for the major subject, it has the peak only at the in-focus point for the major subject. Thus, the focus lens can be driven to the in-focus point for the major subject easily and accurately.

In other words, so-called coarse adjustment is performed by taking advantage of the characteristic of the AF evaluation value signal in the low frequency band, and then fine adjustment is performed by using the characteristic of the AF evaluation value signal in the high frequency band. To put it another way, the frequency band for the AF evaluation value signal used in AF control in the area in the vicinity of the in-focus point for the major subject is different from that used in the other areas.

This can realize both of favorable responsiveness which is the superiority when the AF evaluation value signal in the low frequency band is used and the high AF accuracy which is the superiority when the AF evaluation value signal in the high frequency band is used.

Figure 10A:
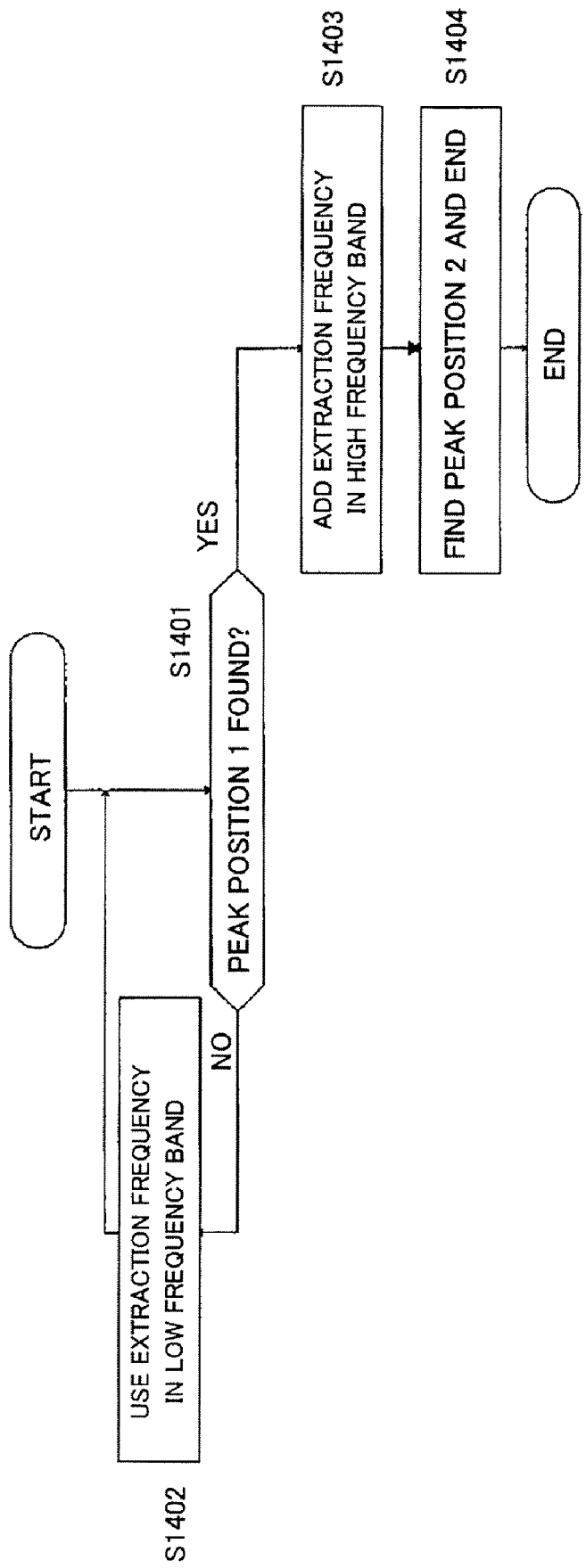
FIG. 10A is a flow chart showing the basic concept of AF control in Embodiment 1.

FIG. 10A is a flow chart showing the basic concept of the AF control described above. A peak position 1 represents the position of the focus lens where the AF evaluation value signal is at the highest level in the first step (coarse adjustment) in which the AF evaluation value signal in the low frequency band is mainly used. A peak position 2 represents the position of the focus lens where the synthesis AF evaluation value signal is at the highest level in the second step (fine adjustment) in which the AF evaluation value signal in the high frequency band is mainly used.

At step S1401, it is determined whether or not the peak position 1 is found. If the peak position 1 is not found, the flow proceeds to step S1402 to mainly use the AF evaluation value signal in the low frequency band. Then, the flow returns to step S1401.

On the other hand, if the peak position 1 is found at step S1401, the flow proceeds to step S1403 to use the synthesis AF evaluation value signal provided by adding the AF evaluation value signal in the high frequency band at a high ratio to the AF evaluation value signal in the low frequency band.

At step S1404, the peak position 2 is found (the focus lens is moved to the peak position 2). Then, the flow is ended.

The above mentioned AF control will hereinafter be described in more detail. In the following description, the coarse adjustment described above is replaced with "adjustment" for providing in-focus accuracy suitable for resolution in the standard TV system, and the fine adjustment is replaced with "in-focus determination operation."

Figure 1:
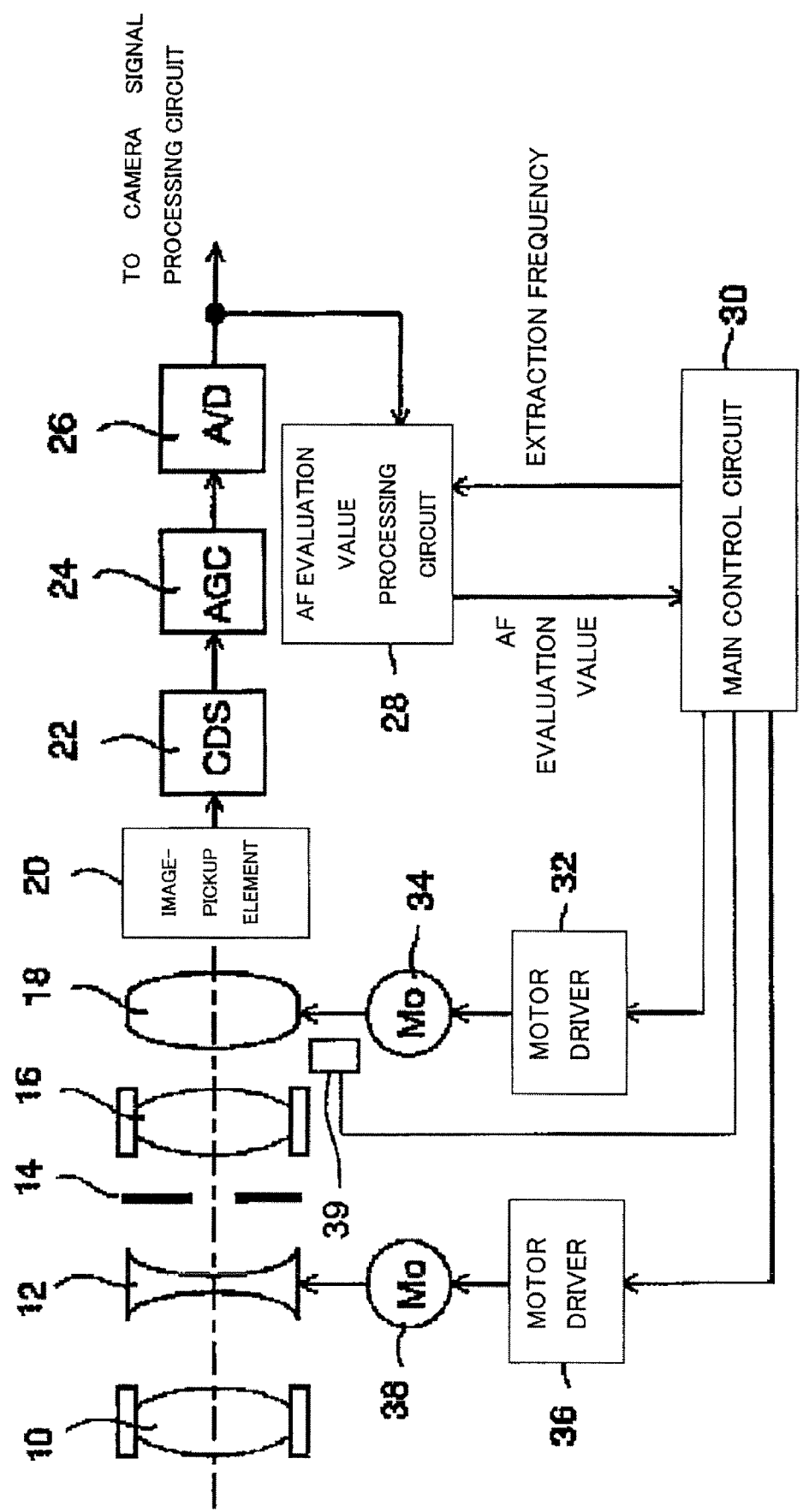
FIG. 1 is a block diagram showing the structure of an image-pickup apparatus which is Embodiment 1 of the present invention.

FIG. 1 shows the structure of an image-pickup apparatus serving as an optical apparatus of Embodiment 1. The image-pickup apparatus is realized by a digital camera or a digital still camera which are integral with a lens in the high-definition system. Moving images or still images may be picked up by the apparatus.

In FIG. 1, reference numeral 10 shows a first fixed lens unit, and 12 a second lens unit (hereinafter referred to as a variable magnification lens) which is movable in the direction of an optical axis to provide variable magnification. Reference numeral 14 shows an aperture stop, 16 a third fixed lens unit. Reference numeral 18 shows a focus compensator (hereinafter referred to as a focus lens) serving as a fourth lens unit which is movable in the optical axis direction to compensate for the movement of a focal plane associated with varied magnification and achieve focusing.

Reference numeral 20 shows an image-pickup element formed of a CCD sensor or a CMOS sensor. Reference numeral 22 shows a CDS circuit which samples an output from the image-pickup element 20, and 24 an AGC circuit which adjusts the gain of the sampled signal. Reference numeral 26 shows an A/D converter which converts an analog signal after the gain adjustment into a digital signal. These components from the image-pickup element 20 to the A/D converter circuit 26 constitute an image-pickup part.

An output from the A/D converter 26 is input to a camera signal processing circuit, not shown. The camera signal processing circuit generates a video signal based on the output from the A/D converter 26. The video signal is recorded on a recording medium, not shown (such as a semiconductor memory, an optical disk, and a magnetic tape), or displayed on a display, not shown.

Reference numeral 38 shows a zoom motor which serves as an actuator for driving the variable magnification lens 12. Reference numeral 36 shows a zoom driver which drives the zoom motor 38 in accordance with a signal from a main control circuit 30, later described.

Reference numeral 34 shows a focus motor which serves as an actuator for driving the focus lens 18. Reference numeral 32 shows a focus driver which drives the focus motor 34 in accordance with a signal from the main control circuit 30.

Reference numeral 28 shows an AF evaluation value processing circuit (AF pre-process circuit) serving as a signal generator which extracts high-frequency components from a digital signal output from the A/D converter 26 and uses the extracted high-frequency components to generate an AF evaluation value signal.

Reference numeral 30 shows the main control circuit which is formed of a microcomputer including a CPU and the like. The main control circuit 30 controls drive of the focus lens 18 through the focus driver 32 based on the AF evaluation value signal from the AF evaluation value processing circuit 28. Specifically, the main control circuit 30 drives the focus lens 18 such that the level of the AF evaluation value signal approaches the maximum as close as possible (desirably reaches the maximum). Reference numeral 39 shows a position detector which detects the position of the focus lens 18.

Figure 2:
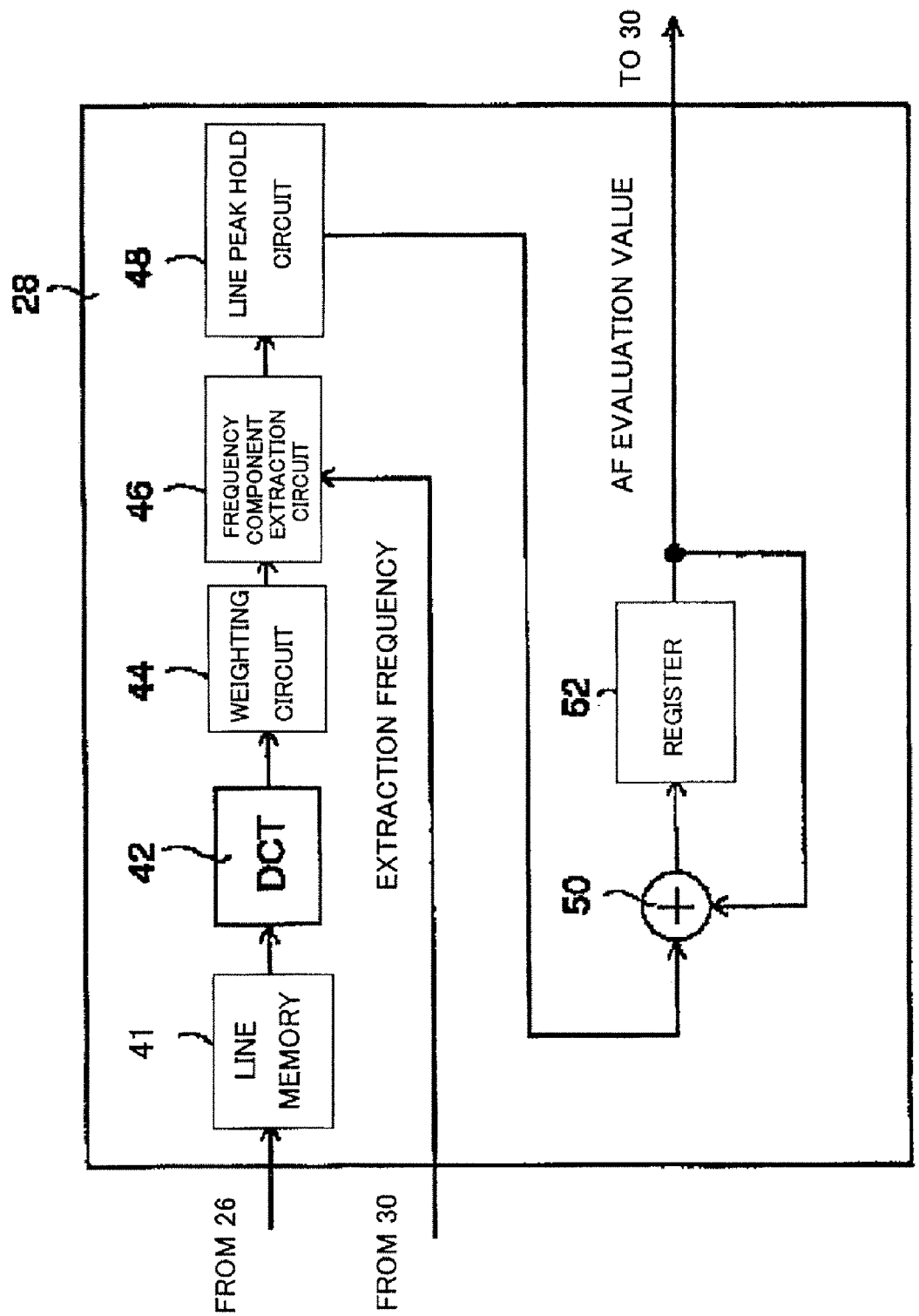
FIG. 2 is a block diagram showing the structure of an AF evaluation value processing circuit in the image-pickup apparatus of Embodiment 1.
Figure 3:
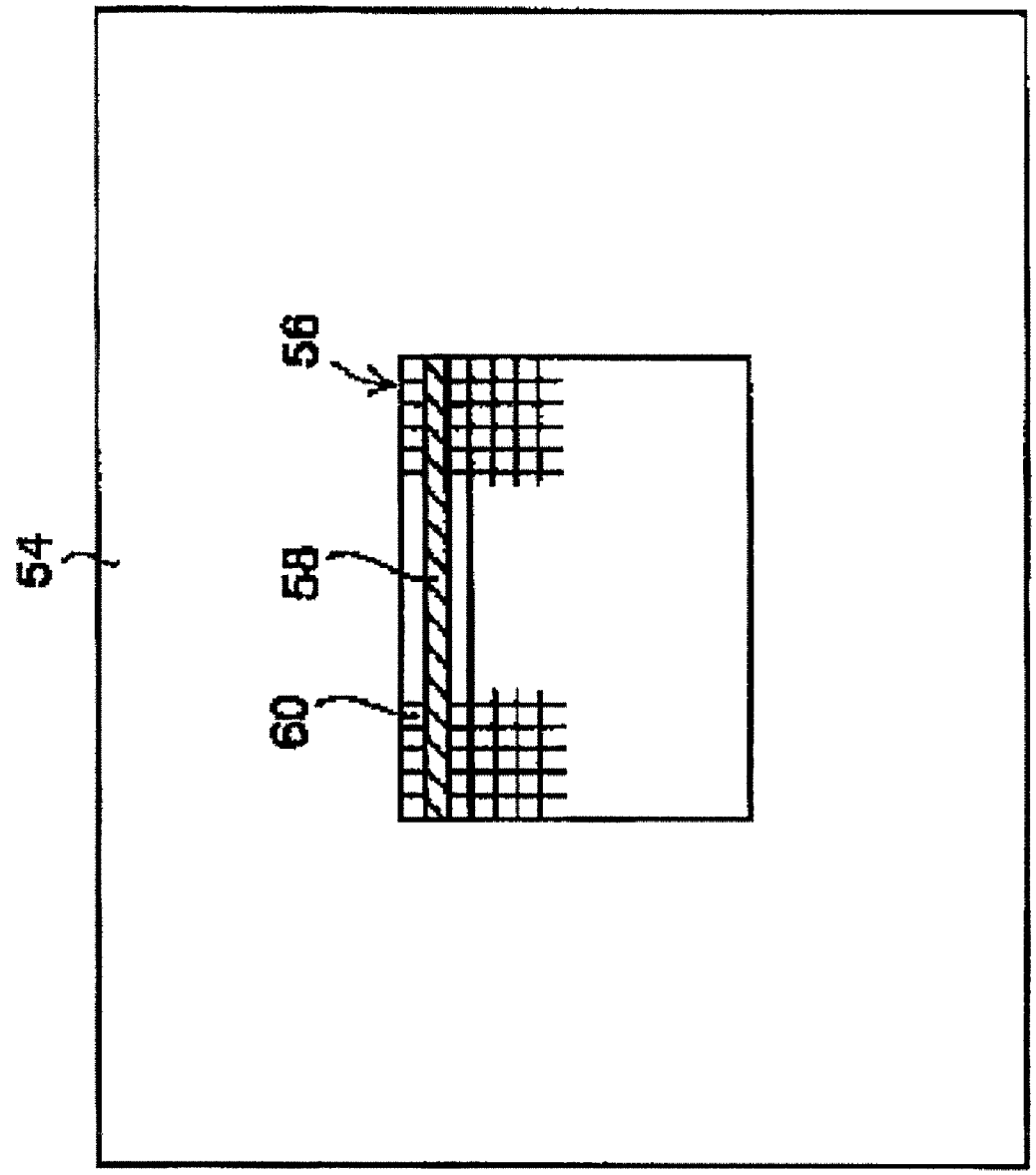
FIG. 3 is a schematic diagram showing the structure of pixels in a focus detection area in the image-pickup apparatus of Embodiment 1.

FIG. 2 shows an example of the structure of the AF evaluation value processing circuit 28. FIG. 3 shows a focus detection area set within an image-pickup screen and the structure of pixels in the focus detection area.

In FIG. 3, a focus detection area 56 is set within a screen 54 for one frame or one field. The focus detection area 56 is formed of a plurality of horizontal lines 58. Each of the horizontal lines 58 is formed of a plurality of pixels 60.

In FIG. 2, a line memory 41 takes and stores pixel data P0, P1, . . . , Pn for one horizontal line in the focus detection area 56 from data output from the A/D converter 26. A discrete cosine transform (DCT) circuit 42 performs orthogonal transformation of the image data for one horizontal line stored in the line memory 41 and outputs original data F0, F1, . . . , Fn for frequency components.

A weighting circuit 44 multiplies the output from the DCT circuit 42 by constants K0 to Kn predetermined to provide substantially uniform levels of the frequency components. In other words, the weighting circuit 44 can output K0×F0, K1×F1 . . . Kn×Fn.

A frequency component extraction circuit 46 extracts and outputs only the components specified by the main control circuit 30 from the outputs K0×F0, K1×F1 . . . Kn×Fn.

A line peak hold circuit 48 holds the maximum value of the output for one line supplied from the frequency component extraction circuit 46 and updates the held value with the maximum value in the next horizontal line for each horizontal line.

An adder 50 and a register 52 form an accumulator. The accumulator serves as an integrator in the vertical direction to cumulatively add outputs from the line peak hold circuit 48. Before the cumulation, zero is set in the register 52. The adder 50 adds the output from the line peak hold circuit 48 to the output from the register 52 and the writes the result of the addition to the register 52. This operation is performed for all of the horizontal lines 58 in the focus detection area 56 to store in the register 52 the cumulative values of the maximums of the predetermined frequency components in all of the horizontal lines 58 of the focus detection area 56. The values stored in the register 52 are supplied to the main control circuit 30 as an AF evaluation value signal (focus signal).

Figure 4:
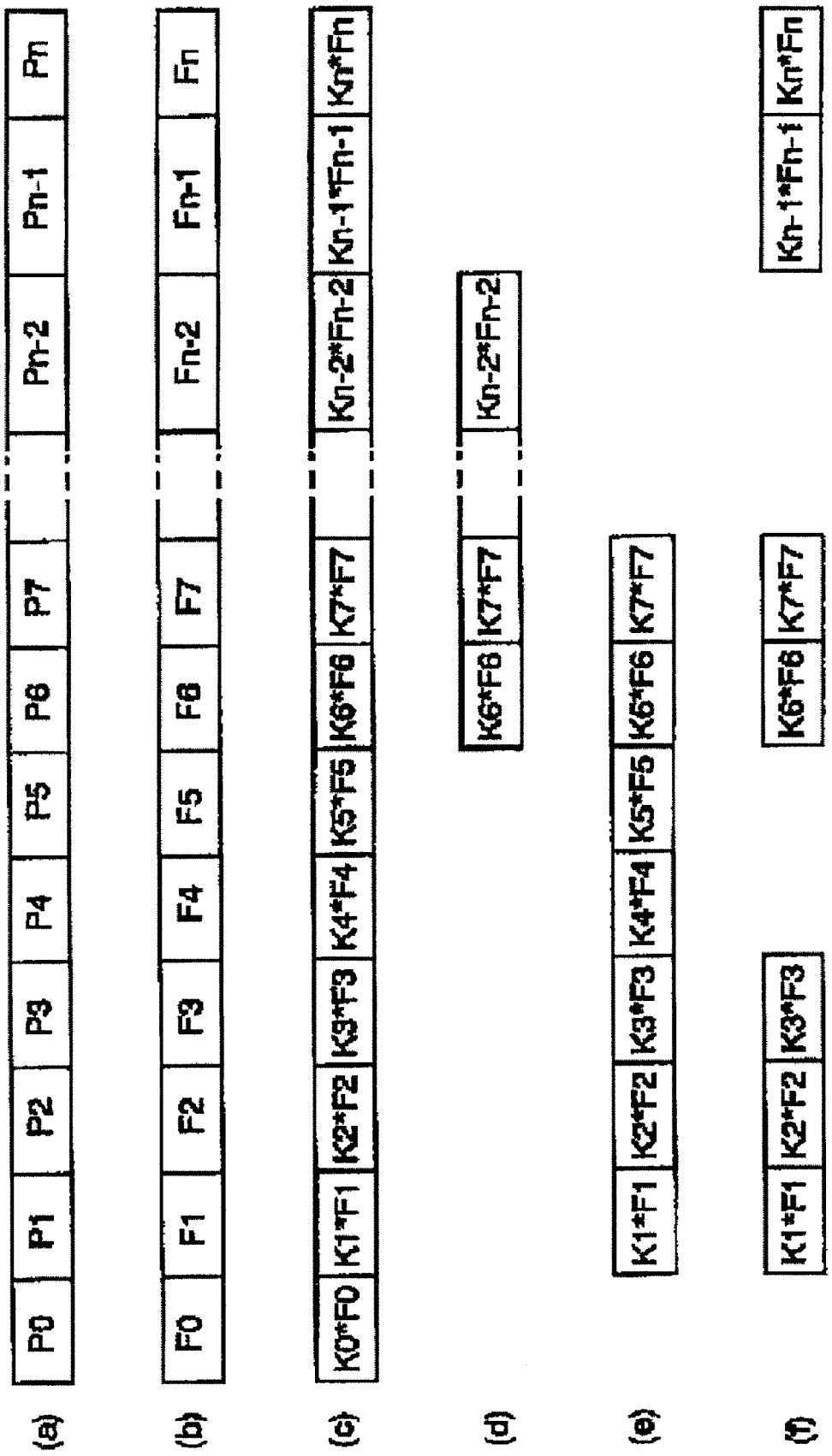
FIG. 4 shows data for use in generating an AF evaluation value signal in the image-pickup apparatus of Embodiment 1.

FIG. 4 shows data in the line memory 41, the DCT circuit 42, the weighting circuit 44, and the frequency component extraction circuit 46. In FIG. 4, (a) shows a string of pixel data stored in the line memory 41, (b) shows a string of data output from the DCT circuit 42. Further, (c) shows a string of data output from the weighting circuit 44 (the frequency components after the weighting). Moreover, (d), (e), and (f) show examples of an output from the frequency component extraction circuit 46.

In the outputs F0 to Fn from the DCT circuit 42, F0 represents the component at the lowest frequency close to the direct current component. The higher the number is as F1, F2, and F3 . . . , the higher the frequency is. Fn represents the component at the highest frequency.

The main control circuit 30 has the function of determining the frequency components and type extracted by the frequency component extraction circuit 46. For example, the main control circuit 30 determines which frequency components are extracted in accordance with the image-pickup system and resolution. The information of the determination is output to the frequency component extraction circuit 46.

In Embodiment 1, a plurality of frequency components are extracted, and a plurality of AF evaluation value signals are generated from the extracted frequency components. The main control circuit 30 can multiply each of the plurality of AF evaluation value signals by a gain and can add the AF evaluation value signals after multiplication by the gain. It can add the AF evaluation value signals at a variable ratio.

Figure 5:
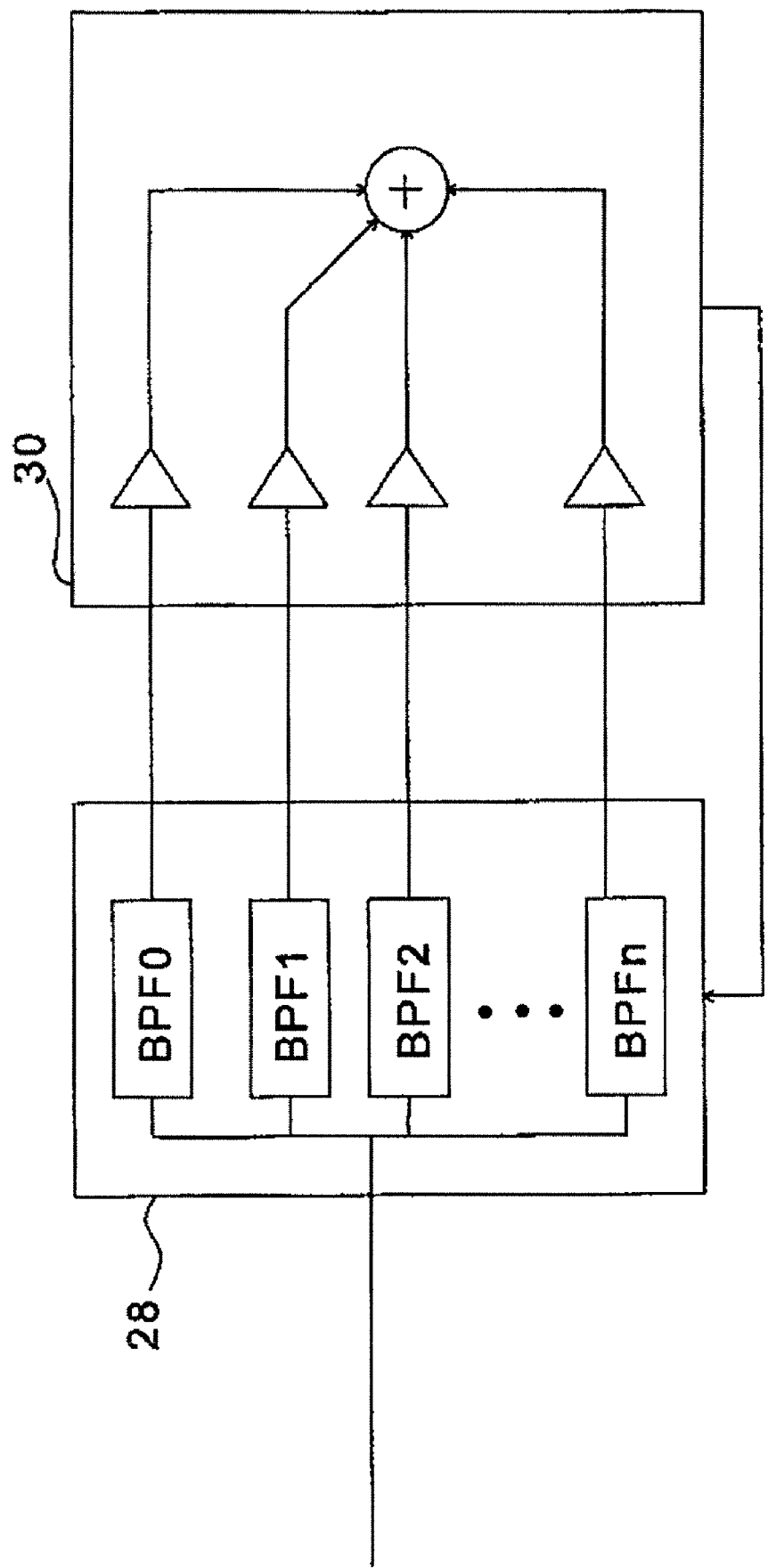
FIG. 5 is a block diagram showing a synthesis circuit for AF evaluation value signals in a main control circuit in the image-pickup apparatus of Embodiment 1.

FIG. 5 shows an example of input of the AF evaluation value signals generated by the AF evaluation value processing circuit 28 to the main control circuit 30 and a synthesis circuit therefor. In FIG. 5, BPFs represent extraction frequency bands in the frequency component extraction circuit 46 and include BPF0 to BPFn. In numbers from zero to n, a higher number represents a relatively and absolutely higher frequency band. The main control circuit 30 can set, from the BPF0 to BPFn, the frequency bands of the AF evaluation value signal to be extracted. As described above, the main control circuit 30 can add the AF evaluation value signals after the extraction. The added AF evaluation value signal will hereinafter be referred to as a synthesis AF evaluation value signal.

The main control circuit 30 can arbitrarily change the gain for the AF evaluation value signal after the extraction. The gain of the AF evaluation value signal can be changed to vary the ratio of the AF evaluation value signal contained in the synthesis AF evaluation value signal.

It can be said from the foregoing that the AF evaluation value processing circuit 28 serves as a signal generator for generating the AF evaluation value signal in each frequency band, and the main control circuit 30 has the function as a signal generator for generating the synthesis AF evaluation value signal by adding (synthesizing) the AF evaluation value signals in the respective frequency bands.

The gain may be set to zero. Setting the gain to zero means that the associated AF evaluation value signal is not added. This may be considered as addition at a ratio of zero.

Next, the AF control performed by the main control circuit 30 will be described with reference to FIGS. 6 to 12. First, the processing in the AF control is described with reference to FIG. 6 which is a flow chart showing the flow of the AF processing operation in the video camera shown in FIG. 1.

In Embodiment 1, the first step of the AF control described above corresponds to the first half of minute-drive control performed at step S601 in FIG. 6 which will be described later in detail with reference to FIG. 7. The second step of the AF control corresponds to the in-focus determination operation (also referred to as an in-focus confirming operation) in the latter half of the above mentioned minute-drive control.

In Embodiment 1, the synthesis AF evaluation value signal used in the first step includes the AF evaluation value signal in the high frequency band at a low ratio or a ratio of zero (that is, none contained) and the AF evaluation value signal in the low frequency band at a high ratio. In the following, such a synthesis AF evaluation value signal is referred to as a first synthesis AF evaluation value signal. The synthesis AF evaluation value signal used in the second step of the AF control includes the AF evaluation value signal in the high frequency band at a high ratio (hereinafter referred to as a second synthesis AF evaluation value signal).

The "ratio" of an AF evaluation value signal component in this case refers to the part of the level of that AF evaluation value signal component in the level of the synthesis AF evaluation value signal. As the ratio is higher, the level of that AF evaluation value signal component is seen more significantly in the level of the synthesis AF evaluation value signal. For example, in a synthesis AF evaluation value signal including an AF evaluation value signal component A, an AF evaluation value signal component B, an AF evaluation value signal component C at the proportion of 0.5:1:1.5, the ratio of these signal components is approximately 0.16:0.33:0.5. Specific ratios of the AF evaluation value signals in the respective frequency bands in the first and second synthesis AF evaluation value signals are described later.

Figure 6:
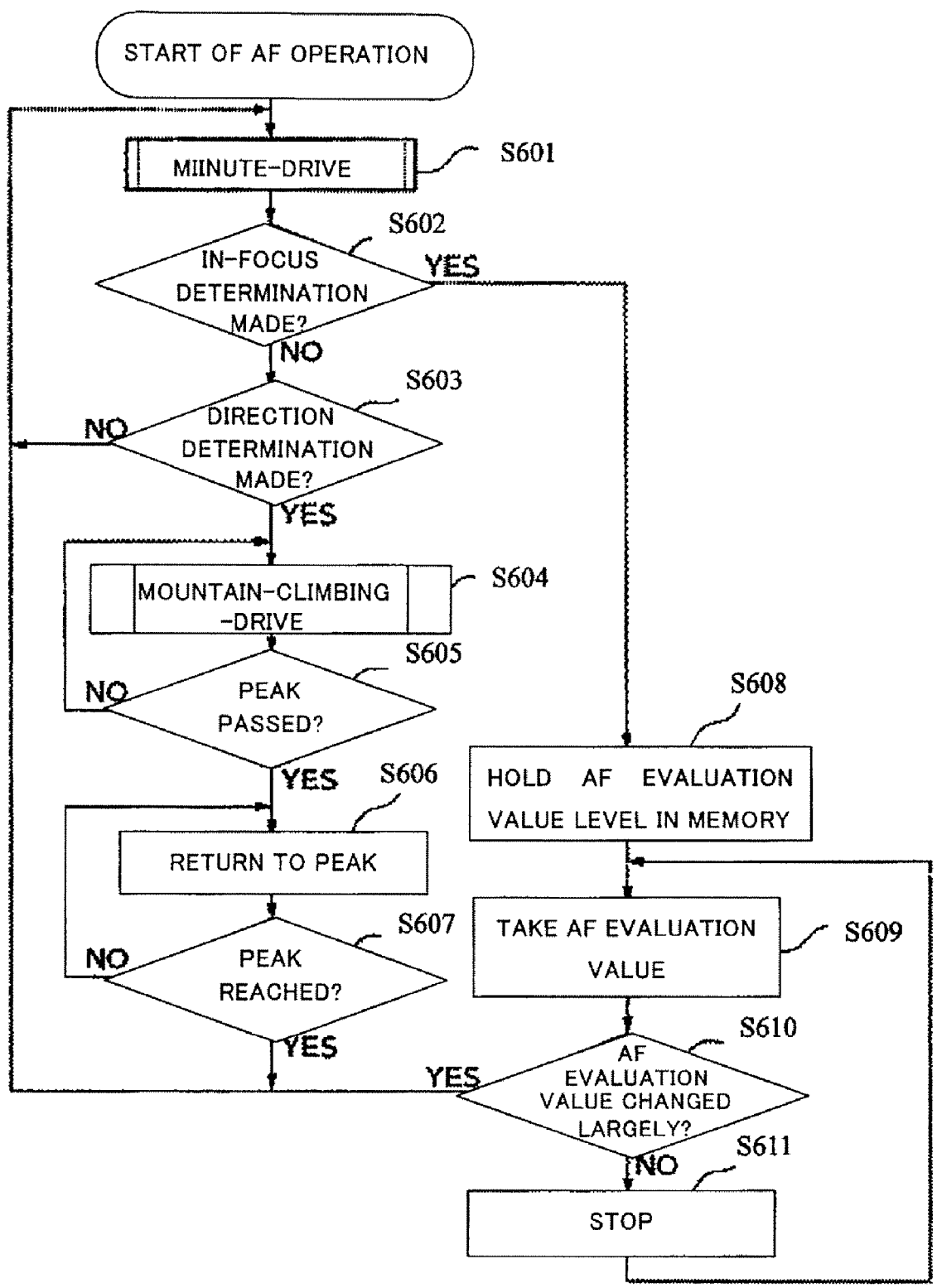
FIG. 6 is a flow chart showing the details of AF control operation in image-pickup apparatuses of Embodiments 1 to 4.

In FIG. 6, at step S601, minute-drive control of the focus lens 18 is performed on the basis of a change in the levels of the first and second synthesis AF evaluation value signals.

Next, at step S602, it is determined whether or not in-focus determination is made during the control of the minute (to-and-from)-drive. The in-focus determination is described later. If it is determined that the in-focus determination is not made, the flow proceeds to step S603, or to step S608 if it is determined that the in-focus determination is made.

At step S603, it is determined whether or not the moving direction of the focus lens 18 is determined on the basis of a change in the level of the first synthesis AF evaluation value signal. The moving direction determination is described later. If it is determined that the moving direction is determined, the flow proceeds to step S604, or returns to step S601 if it is determined that the moving direction is not determined.

At step S604, the focus lens 18 is driven at high speed in the direction in which the level of the first synthesis AF evaluation value signal is increased (this is mountain-climbing drive). Then, the flow proceeds to next step S605.

At step S605, it is determined whether or not the level of the first synthesis AF evaluation value signal has passed the peak. If it is determined that the first synthesis AF evaluation value signal has not passed the peak yet, the flow returns to step S604. If it is determined that the first synthesis AF evaluation value signal has passed the peak, the flow proceeds to step S606.

At step S606, the focus lens 18 is returned to the position (the peak position 1) where the first synthesis AF evaluation value signal is at the peak level.

Next, at step S607, it is determined whether or not the focus lens 18 is returned to the peak position 1. If it is determined that it is not returned to the peak position 1, the flow returns to step S606. If it is determined that it is returned to the peak position 1, the flow returns to step S601. At step 601, the minute-drive control is performed again to perform the in-focus determination operation, described later.

On the other hand, at step S608, the level of the first synthesis AF evaluation value signal at the peak position 1 is stored in a memory, not shown. At next step S609, the latest first synthesis AF evaluation value signal is taken.

Then, at step S610, the level (the previous level) of the first synthesis AF evaluation value signal stored in the memory at step S608 is compared with the latest level (the current level) of the first synthesis AF evaluation value signal taken at step S609. It is determined whether or not the difference between the previous level and the current level is larger than a predetermined value (whether or not the change in the level of the first synthesis AF evaluation value signal is large) If the difference is larger than the predetermined value, the flow returns to step S601 to restart the first step of the AF control. If the difference is equal to or less than the predetermined value, the flow proceeds to step S611.

At step S611, the drive of the focus lens 18 is stopped and the flow returns to step S609.

Next, the above mentioned minute-drive control performed at step S601 will be described with reference to a flow chart in FIG. 7.

At step S700, the frequency bands of the plurality (at least two) of the AF evaluation value signals for generating the first synthesis AF evaluation value signal used in the first step of the minute-drive control and the gains for the AF evaluation value signals are set. For example, the setting is made as follows:

BPF0: Frequency Band 0.5 MHz, Gain 100%
BPF1: Frequency Band 2 MHz, Gain 100%
BPF2: Frequency Band 5 MHz, Gain 10%

In the above mentioned setting, in contrast to the gains for the AF evaluation value signals in the low frequency bands shown in BPF0 and BPF1, the gain for the AF evaluation value signal in the high frequency band shown in BPF2 is reduced to as low as 10%. This results in the first synthesis AF evaluation value signal containing the AF evaluation value signal in the high frequency band (5 MHz) at a low ratio. The component ratio of the AF evaluation value signal in the high frequency band is approximately 0.05.

The low component ratio of the AF evaluation value signal in the high frequency band can reduce the effect thereof on the responsiveness. While the description is made with the gain set to 10% for the AF evaluation value signal in the high frequency band, the gain may be set to zero to eliminate the effect thereof on the responsiveness.

At step S701, the AF evaluation value signals of BPF0 to BPF2 are taken from the AF evaluation value processing circuit 28 and multiplied by the gains set as described above and then added to generate the first synthesis AF evaluation value signal. The level of the generated first synthesis AF evaluation value signal is stored in a memory, not shown, together with the position of the focus lens 18 detected by the position detector 39.

Next, at step S702, it is determined whether or not the current level of the first synthesis AF evaluation value signal generated at step S701 is higher than the level of the previously generated first synthesis AF evaluation value signal. If it is determined that the current level is lower than the previous level, the flow proceeds to step S703. If it is determined that the current level is higher than the previous level, the flow proceeds to step S706.

At step S703, the previous position of the focus lens 18 is stored as the peak position 1 in the memory, and the first synthesis AF evaluation value signal stored at step S701 is cleared. The focus lens 18 is driven in the direction opposite to the direction in the previous drive by a predetermined amount. Then, the flow proceeds to step S704.

At step S706, the current position of the focus lens 18 is stored as the peak position 1 in the memory, and the current level of the first synthesis AF evaluation value signal stored at step S701 is stored in the memory as the peak value. The focus lens 18 is driven in the same direction as the direction in the previous drive (forward direction) by a predetermined amount. Then, the flow proceeds to step S704.

At step S704, it is determined whether or not the focus lens 18 is driven consecutively in the same direction a predetermined number of times. In other words, it is determined whether or not the same result is provided consecutively the predetermined number of times in determination of the in-focus direction in which the level of the first synthesis AF evaluation value signal is increased as compared with the previous determination. If it is determined that the in-focus direction is not the same the predetermined number of times consecutively, the flow proceeds to step S705. In this case, the focus lens 18 slightly passes the position corresponding to the highest level of the first synthesis AF evaluation value signal. The position of the focus lens at this point is in a predetermined range including the highest level of the first synthesis AF evaluation value signal. If it is determined that the in-focus direction is the same the predetermined number of times consecutively, the flow proceeds to step S709.

At step S705, the in-focus determination operation is started as the second step. The peak position provided up to step S704 is the peak position 1 based on the first synthesis AF evaluation value signal. At step S705, the frequency bands of the plurality of AF evaluation value signals for generating the second synthesis AF evaluation value signal used in the in-focus determination and the gains for the AF evaluation value signals are set. For example, the setting is made as follows:

BPF0: Frequency Band 0.5 MHz, Gain 100%
BPF1: Frequency Band 2 MHz, Gain 100%
BPF2: Frequency Band 5 MHz, Gain 100%

The gain for the AF evaluation value signal of the BPF2 is increased to provide a higher component ratio of the AF evaluation value signal in the high frequency band (5 MHz) as compared with the first synthesis AF evaluation value signal. The component ratio is approximately 0.33.

At step S707, it is determined whether or not to-and-from movement of the focus lens 18 is repeated a predetermined number of times in the same area based on the second synthesis AF evaluation value signal. If the to-and-from movement is repeated, the focus lens 18 continues the to-and-from movement around the position corresponding to the highest level of the second synthesis AF evaluation value signal (the peak position 2). If it is determined that the to-and-from movement is repeated the predetermined number of times, the flow proceeds to step S708. If it is determined that the to-and-from movement is not repeated the predetermined number of times, the flow proceeds to step S710.

At step S708, since in-focus determination is made, a flag indicating that is set and the focus lens 18 is moved to the peak position 2 which is a predetermined position within the above mentioned to-and-fro movement area (for example, the central position in the changed levels of the second synthesis AF evaluation value signal). The flag is used in the determination at step S602 in FIG. 6. Then, the flow proceeds to step S710.

At step S710, the following setting is made to provide the first synthesis AF evaluation value signal again. Then, the processing operation is ended.

BPF0: Frequency Band 0.5 MHz, Gain 100%
BPF1: Frequency Band 2 MHz, Gain 100%
BPF2: Frequency Band 5 MHz, Gain 10%

At step S709, since the in-focus direction determination is made, a flag indicating that is set. The flag is used in the determination at step S603 in FIG. 6. Then, the flow proceeds to step S710.

As described above, n Embodiment 1, the different gains are used for the AF evaluation value signal component in the high frequency band between the area in the vicinity of the in-focus point and the other areas, thereby changing the ratio of that signal component in the synthesis AF evaluation value signal that is used. This can improve the responsiveness in the AF control and the in-focus accuracy.

The settings of the frequency bands for the AF evaluation value signals and the gains shown in Embodiment 1 are merely illustrative, and they may be set as illustrated in setting examples 1 to 7 below. The values in the upper parts in the setting examples 1 to 7 show examples of the first synthesis AF evaluation value signal set at steps S700 and S710, while the values in the lower part show examples of the second synthesis AF evaluation value signal set at step S705.

Setting example 1: no signal component in the high frequency band is contained in the first synthesis AF evaluation value signal BPF0: Frequency Band 0.5 MHz, Gain 100%
BPF1: Frequency Band 2 MHz, Gain 100%
BPF2: Frequency Band 5 MHz, Gain 0%
- - - >
BPF0: Frequency Band 0.5 MHz, Gain 100%
BPF1: Frequency Band 2 MHz, Gain 100%
BPF2: Frequency Band 5 MHz, Gain 100%

Setting example 2: the gain for the signal component in the low frequency band is reduced in the second synthesis AF evaluation value signal BPF0: Frequency Band 0.5 MHz, Gain 100%
BPF1: Frequency Band 2 MHz, Gain 100%
BPF2: Frequency Band 5 MHz, Gain 0%
- - - >
BPF0: Frequency Band 0.5 MHz, Gain 50%
BPF1: Frequency Band 2 MHz, Gain 50%
BPF2: Frequency Band 5 MHz, Gain 120%

Setting example 3: the frequency bands are changed in the second synthesis AF evaluation value signal BPF0: Frequency Band 0.5 MHz, Gain 100%
BPF1: Frequency Band 2 MHz, Gain 100%
BPF2: Frequency Band 5 MHz, Gain 0%
- - - >
BPF0: Frequency Band 1 MHz, Gain 50%
BPF1: Frequency Band 3 MHz, Gain 50%
BPF2: Frequency Band 5 MHz, Gain 120%

Setting example 4: the number of the frequency bands is not limited to three

BPF0: Frequency Band 0.5 MHz, Gain 100%
BPF1: Frequency Band 2 MHz, Gain 100%
BPF2: Frequency Band 5 MHz, Gain 10%
BPF3: Frequency Band 10 MHz, Gain 0%

--->
    BPF0: Frequency Band 0.5 MHz, Gain 90%
    BPF1: Frequency Band 2 MHz, Gain 110%
    BPF2: Frequency Band 5 MHz, Gain 100%
    BPF3: Frequency Band 10 MHz, Gain 100%

Setting example 5: the low frequency bands are changed in the second synthesis AF evaluation signal and the number thereof is reduced BPF0: Frequency Band 0.5 MHz, Gain 100%
    BPF1: Frequency Band 2 MHz, Gain 100%
    BPF2: Frequency Band 5 MHz, Gain 10%
    BPF3: Frequency Band 10 MHz, Gain 0%
    --->
    BPF0: Frequency Band 0.3 MHz, Gain 0%
    BPF1: Frequency Band 1.5 MHz, Gain 50%
    BPF2: Frequency Band 5 MHz, Gain 10%
    BPF3: Frequency Band 10 MHz, Gain 120%

Setting example 6: the gain in the frequency band between the highest frequency band and the lowest frequency hand is increased in the second synthesis AF evaluation value signal BPF0: Frequency Band 0.5 MHz, Gain 100%
    BPF1: Frequency Band 2 MHz, Gain 100%
    BPF2: Frequency Band 5 MHz, Gain 10%
    BPF3: Frequency Band 10 MHz, Gain 0%
    --->
    BPF0: Frequency Band 0.3 MHz, Gain 10%
    BPF1: Frequency Band 1.5 MHz, Gain 110%
    BPF2: Frequency Band 5 MHz, Gain 10%
    BPF3: Frequency Band 10 MHz, Gain 120%

Setting example 7: the frequency component with the increased gain (that is, the increased ratio) may not be the component in the highest frequency band and may be a component in a relatively high frequency band BPF0: Frequency Band 0.5 MHz, Gain 100%
    BPF1: Frequency Band 3 MHz, Gain 100%
    BPF2: Frequency Band 6 MHz, Gain 5%
    BPF3: Frequency Band 8 MHz, Gain 5%
    --->
    BPF0: Frequency Band 0.5 MHz, Gain 100%
    BPF1: Frequency Band 3 MHz, Gain 100%
    BPF2: Frequency Band 6 MHz, Gain 100%
    BPF3: Frequency Band 8 MHz, Gain 5%

The frequency bands for the AF evaluation value signals and the gains can be appropriately changed as in the setting examples to realize fine adjustment of the responsiveness and in-focus accuracy. For example, they can be changed arbitrarily in accordance with various conditions in picking up images such as the image-pickup system, the brightness of an object, the number of pixels for recording, the density of pixels, moving images to be picked up, and still images to be picked up.

Embodiment 2

Embodiment 2 of the present invention will hereinafter be described. The basic structure of an image-pickup apparatus in Embodiment 2 is identical to the structure described with reference to FIG. 1 in Embodiment 1. Components identical to those in Embodiment 1 are designated with the same reference numerals as those in FIG. 1.

In Embodiment 2, the in-focus determination is made using the first synthesis AF evaluation value signal in the first step of minute-drive control, and then, in the second step, final in-focus determination is made using the second synthesis AF evaluation value signal. Each in-focus determination is performed on the basis of a repeat of to-and-fro movement of the focus lens 18 a predetermined number of times in the same area.

In other words, coarse in-focus determination is first made (in a wide allowable area) by confirming a repeat of to-and-fro movement a predetermined number of times using the first synthesis AF evaluation value signal containing a large amount of low-frequency components. Then, highly accurate in-focus determination is made by observing a repeat of to-and-fro movement a predetermined number of times using the second synthesis AF evaluation value signal containing a large amount of high-frequency components. This can effectively eliminate the effect of a background and the like to increase the probability of achieving focus on the major subject as compared with Embodiment 1 in which only the second synthesis AF evaluation value signal is used in the in-focus determination.

Figure 7:
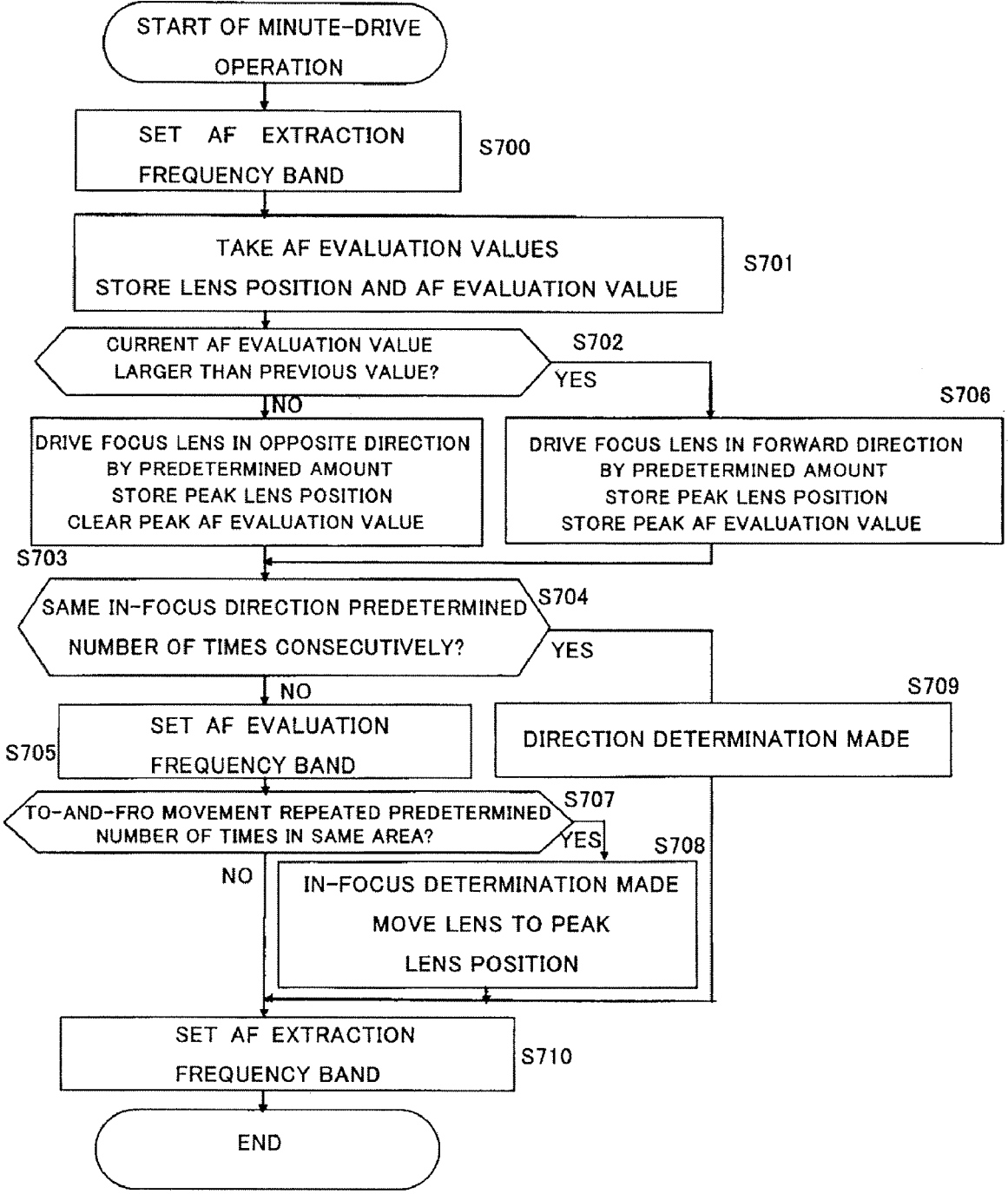
FIG. 7 is a flow chart showing the details of minute-drive control in the image-pickup apparatuses of Embodiments 1 and 3.
Figure 8:
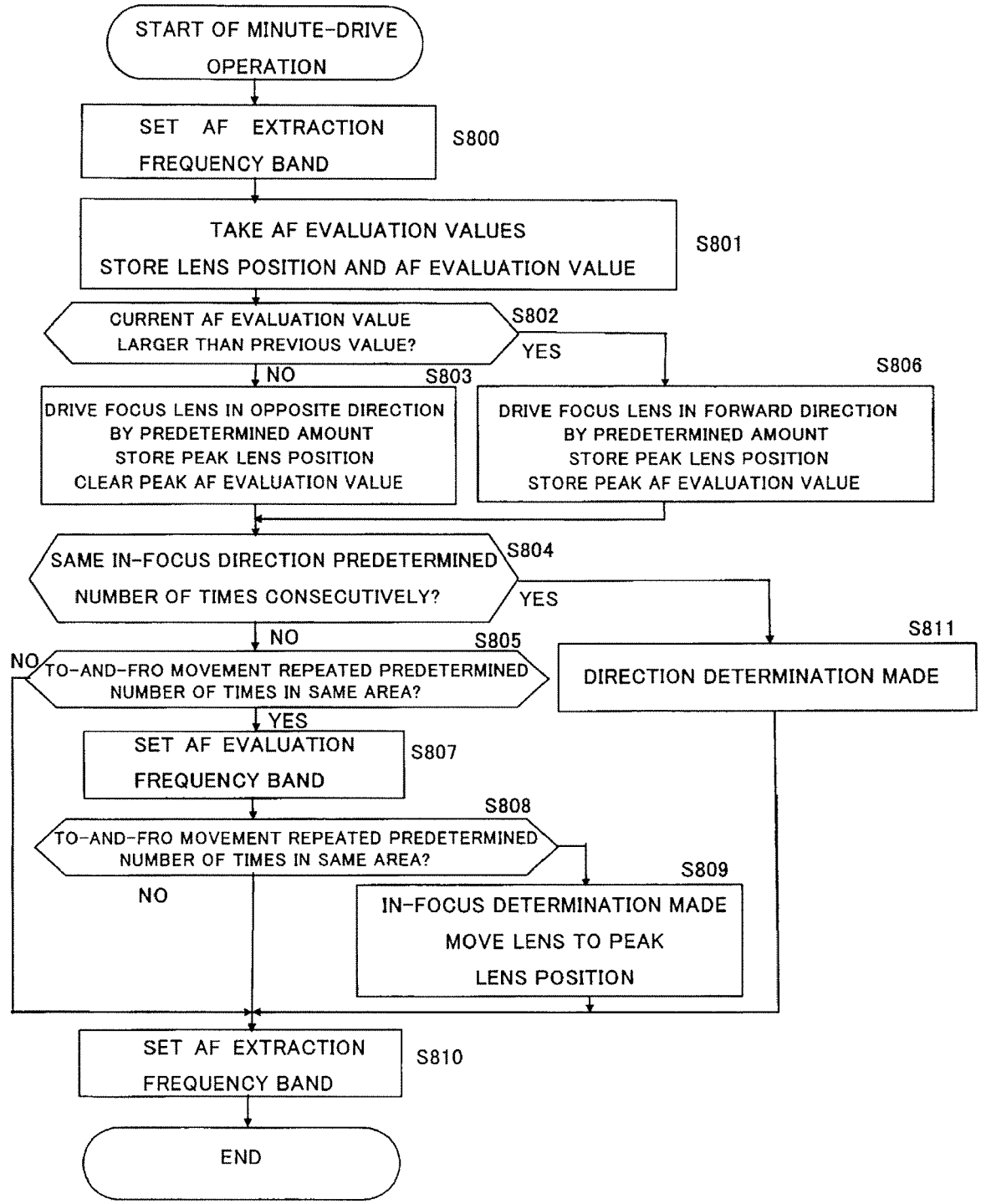
FIG. 8 is a flow chart showing the details of minute-drive control in the image-pickup apparatuses of Embodiments 2 and 4.

FIG. 8 is a flow chart showing the flow of the minute-drive control in AF control performed by the main control circuit 30 in Embodiment 2. The portion of the AF control other than the minute-drive control is identical to that described in Embodiment 1 with reference to FIG. 7.

In FIG. 8, at step S800, the frequency bands of a plurality of AF evaluation value signals for generating the first synthesis AF evaluation value signal used in the first step of the minute-drive control and the gains for the AF evaluation value signals are set. For example, the setting is made as follows:

BPF0: Frequency Band 0.5 MHz, Gain 100%
    BPF1: Frequency Band 2 MHz, Gain 100%
    BPF2: Frequency Band 5 MHz, Gain 10%

Next, at step S801, the AF evaluation value signals of BPF0 to BPF2 are taken from an AF evaluation value processing circuit 28 and multiplied by the gains set as described above and then added to generate the first synthesis AF evaluation value signal. The level of the generated first synthesis AF evaluation value signal is stored in a memory, not shown, together with the position of the focus lens 18 detected by the position detector 39.

Then, at step S802, it is determined whether or not the current level of the first synthesis AF evaluation value signal generated at step S801 is higher than the level of the previously generated first synthesis AF evaluation value signal. If it is determined that the current level is lower than the previous level, the flow proceeds to step S803. If it is determined that the current level is higher than the previous level, the flow proceeds to step S806.

At step S803, the previous position of the focus lens 18 is stored as the peak position 1 in the memory, and the first synthesis AF evaluation value signal stored at step S801 is cleared. The focus lens 18 is driven in the direction opposite to the direction in the previous drive by a predetermined amount. Then, the flow proceeds to step S804.

At step S806, the current position of the focus lens 18 is stored as the peak position 1 in the memory, and the level of the first synthesis AF evaluation value signal stored at step S801 is stored as the peak value in the memory. The focus lens 18 is driven in the same direction as the direction in the previous drive (the forward direction) by a predetermined amount. Then, the flow proceeds to step S804.

At step S804, it is determined whether or not the focus lens 18 is driven consecutively in the same direction a predetermined number of times. In other words, it is determined whether or not the same result is provided consecutively a predetermined number of times in determination of the in-focus direction in which the level of the first synthesis AF evaluation value signal is increased as compared with the previous determination. If it is determined that the in-focus direction is not the same the predetermined number of times consecutively, the flow proceeds to step S805. In this case, the focus lens 18 slightly passes the position corresponding to the highest level of the first synthesis AF evaluation value signal. The position of the focus lens at this point is close to the position corresponding to the highest level of the first synthesis AF evaluation value signal. If it is determined that the in-focus direction is the same the predetermined number of times consecutively, the flow proceeds to step S811.

At step S805, the in-focus determination operation is started in the first step. With the first synthesis AF evaluation value signal used, it is determined whether or not to-and-fro movement of the focus lens 18 is repeated a predetermined number of times in the same area. If the to-and-fro movement is repeated, the focus lens 18 continues the to-and-fro movement around the position corresponding to the highest level of the first synthesis AF evaluation value signal. If it is determined that the to-and-fro movement is repeated the predetermined number of times, the flow proceeds to step S807. If it is determined that the to-and-fro movement is not repeated the predetermined number of times, the flow proceeds to step S810.

At step S807, the in-focus determination operation is started in the second step. The frequency bands of a plurality of AF evaluation value signals for generating the second synthesis AF evaluation value signal and the gains for the AF evaluation value signals are set. For example, the setting is made as follows:

BPF0: Frequency Band 0.5 MHz, Gain 100%
BPF1: Frequency Band 2 MHz, Gain 100%
BPF2: Frequency Band 5 MHz, Gain 100%

Next, at step S808, it is determined whether or not to-and-fro movement of the focus lens 18 is repeated a predetermined number of times in the same area based on the second synthesis AF evaluation value signal. If the to-and-fro movement is repeated, the focus lens 18 continues the to-and-fro movement around the position corresponding to the highest level of the second synthesis AF evaluation value signal (peak position 2). If it is determined that the to-and-fro movement is repeated the predetermined number of times, the flow proceeds to step S809. If it is determined that the to-and-fro movement is not repeated the predetermined number of times, the flow proceeds to step S810.

At step S809, since in-focus determination is made, a flag indicating that is set and the focus lens 18 is moved to the peak position 2 which is a predetermined position within the abovementioned to-and-fro movement area (for example, the central position in the changed levels of the second synthesis AF evaluation value signal). Then, the flow proceeds to step S810.

At step S810, the following setting is made to provide the first synthesis AF evaluation value signal again. Then, the processing operation is ended.

BPF0: Frequency Band 0.5 MHz, Gain 100%
BPF1: Frequency Band 2 MHz, Gain 100%
BPF2: Frequency Band 5 MHz, Gain 10%

At step S811, since in-focus direction determination is made, a flag indicating that is set. Then, the flow proceeds to step S810.

As described above, according to Embodiment 2, the in-focus determination is made with the first synthesis AF evaluation value signal to detect the major subject more reliably than in Embodiment 1. Then, the in-focus determination is made with the second synthesis AF evaluation value signal to provide highly accurate focusing for the major subject. This can improve the responsiveness in the AF control and the in-focus accuracy.

The settings of the frequency bands for the AF evaluation value signals and the gains shown in Embodiment 2 are merely illustrative, and they may be set as illustrated in the setting examples 1 to 7 described in Embodiment 1.

Embodiment 3

Figure 9:
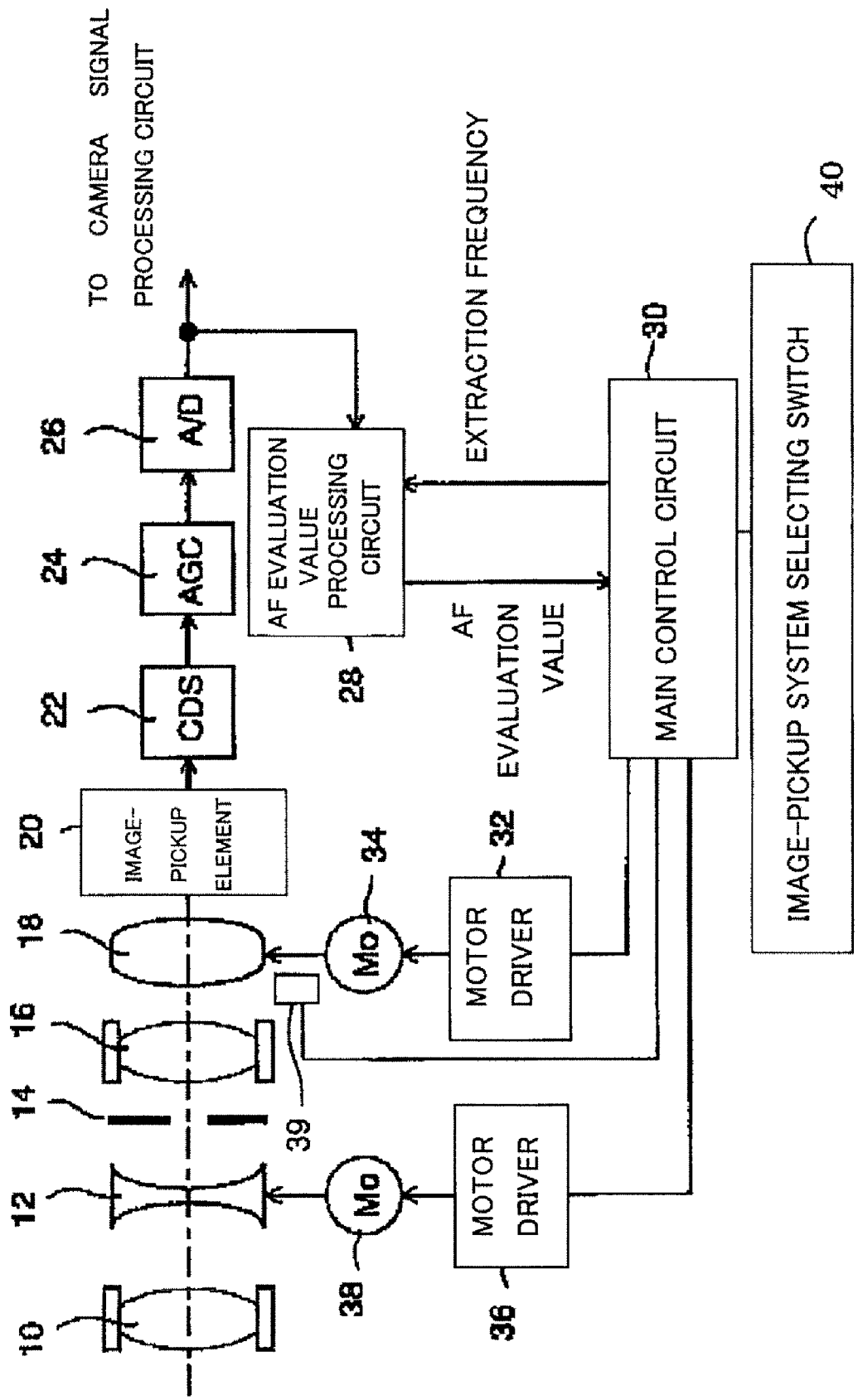
FIG. 9 is a block diagram showing the structure of an image-pickup apparatus of Embodiment 3.

Embodiment 3 of the present invention will hereinafter be described. FIG. 9 shows the structure of an image-pickup apparatus serving as an optical apparatus of Embodiment 3. The image-pickup apparatus is realized by a video camera or a digital still camera which are integral with a lens and its image-pickup system can be switched between the standard TV system and the high-definition system. Moving images or still images may be picked up by the apparatus. Components of the camera identical to those in Embodiment 1 are designated with the same reference numerals as those in Embodiment 1 and the description thereof is omitted.

In FIG. 9, reference numeral 40 shows an image-pickup system selecting switch for allowing an operator to select image pickup in the standard TV system such as NTSC and PAL or image pickup in the high-definition system. In other words, the switch 40 is provided for setting the resolution of images to be picked up. When the switch 40 is used to select the standard TV system, an image signal with resolution suitable for the standard TV system is generated by a camera signal processing circuit, not shown. When the high-definition system is selected, an image signal with resolution suitable for the high-definition system is generated by the camera signal processing circuit.

In Embodiment 3, when the standard TV system is selected, a main control circuit 30 sets a plurality (at least two) of extraction frequency bands and gains for providing an AF evaluation value signal (first synthesis AF evaluation value signal) appropriate for the standard TV system. The first synthesis AF evaluation value signal is used to perform operation in a first step and in-focus determination operation in a second step of AF control.

On the other hand, when the high-definition system is selected, as described in Embodiment 1, a first synthesis AF evaluation value signal is first used to perform operation in a first step of AF control. Then, extraction frequency bands and gains for providing an AF evaluation value signal (second synthesis AF evaluation value signal) appropriate for the high-definition system are set, and the second synthesis AF evaluation value signal is used to perform in-focus determination operation in a second step.

Figure 10B:
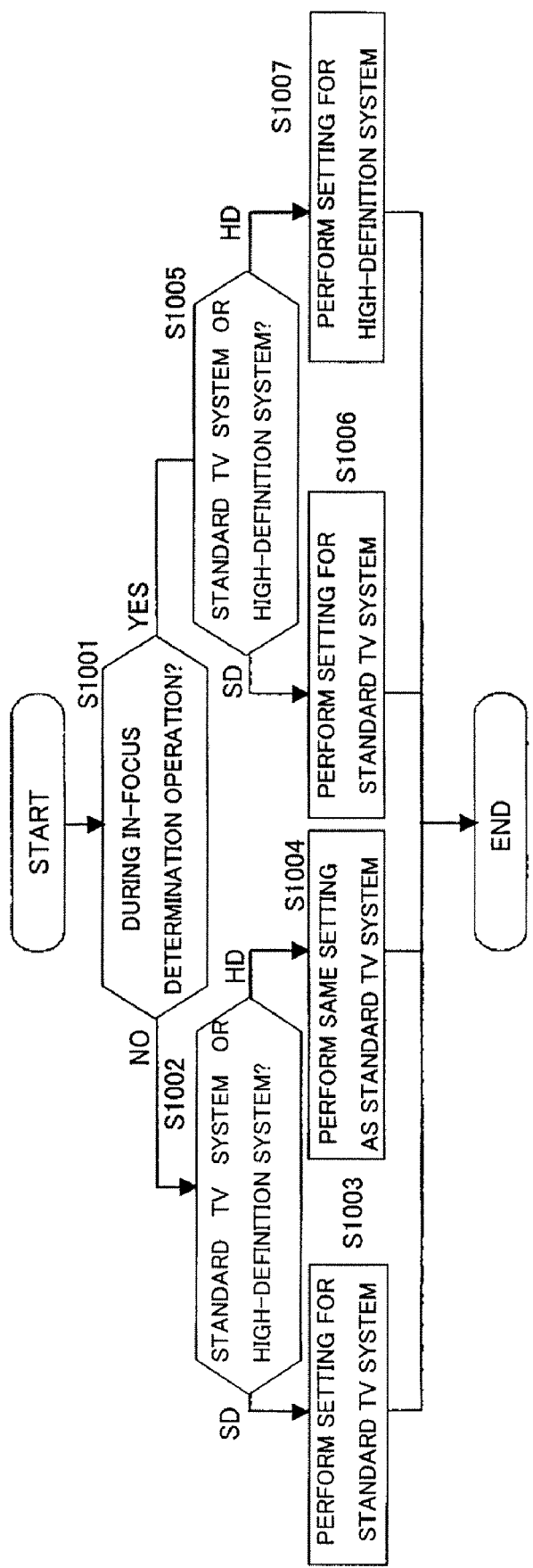
FIG. 10B is a flow chart showing the basic concept of the setting of extraction frequency bands for an AF evaluation value signal and gains in Embodiments 3 and 4.
Figure 11A:
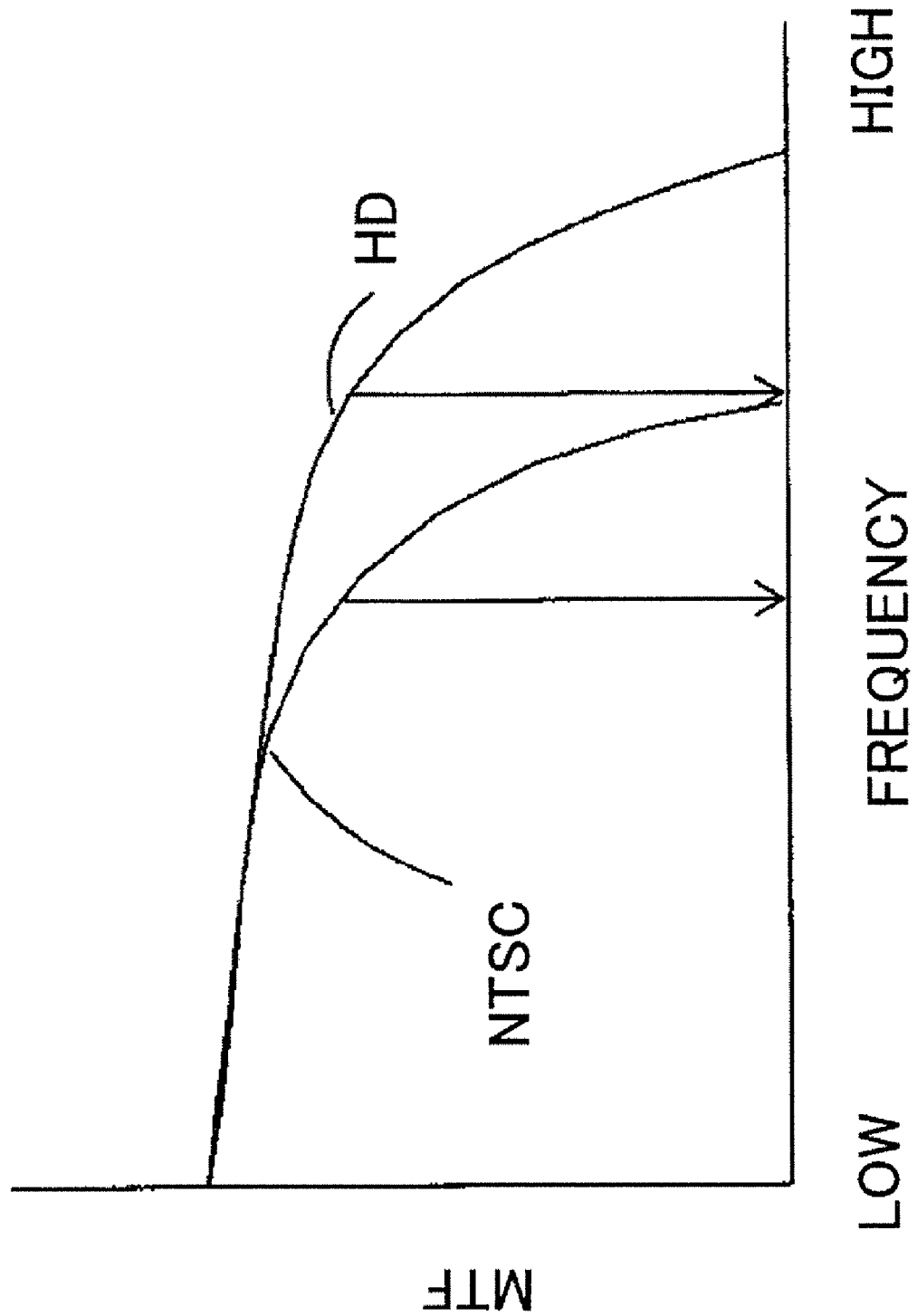
FIG. 11A is a graph showing a comparison between a resolution spatial frequency for an NTSC system and a resolution spatial frequency for a high-definition system.
Figure 11B:
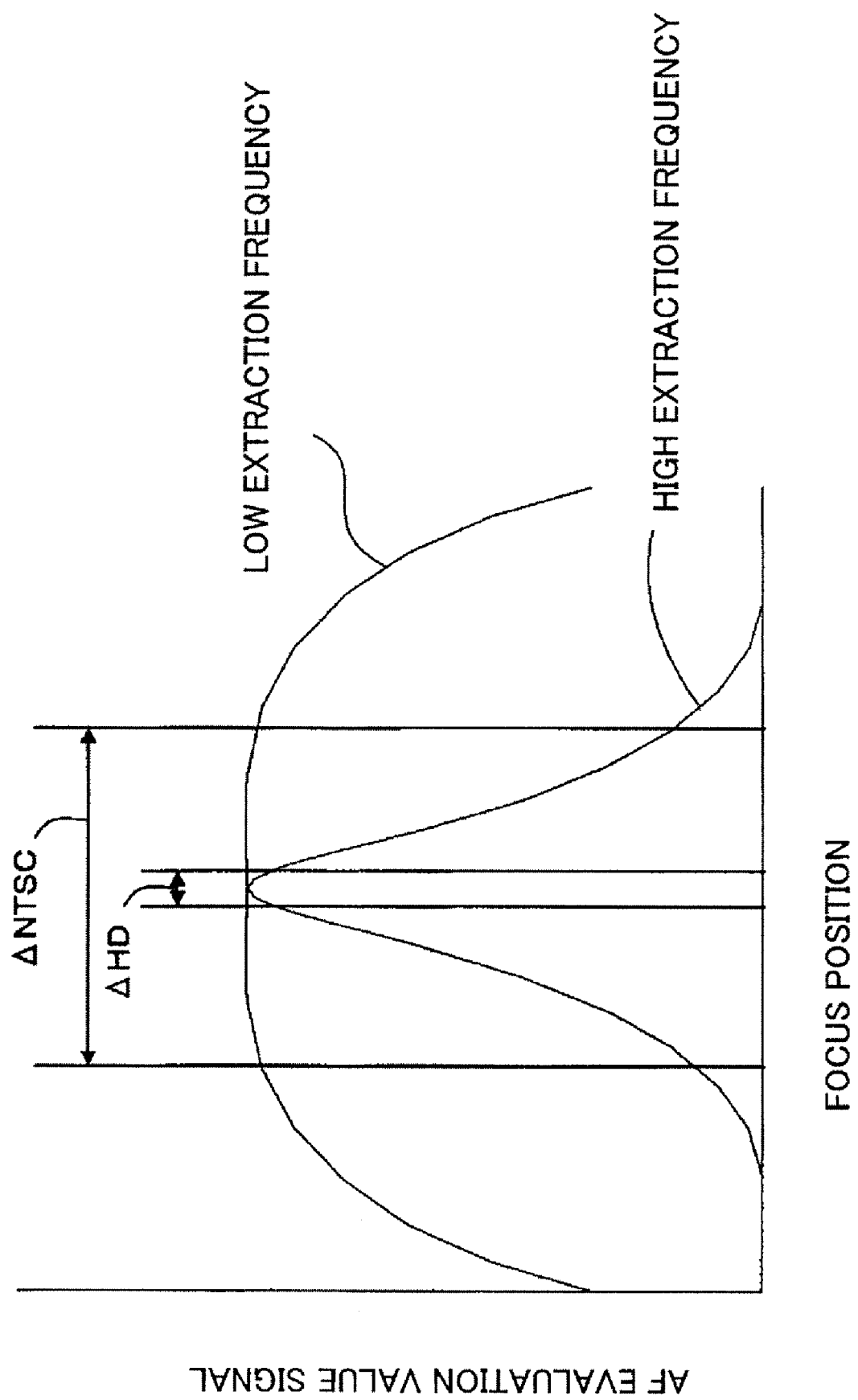
FIG. 11B is a graph showing a relationship between an AF evaluation value signal in a high frequency band and an AF evaluation value signal in a low frequency band.
Figure 11C:
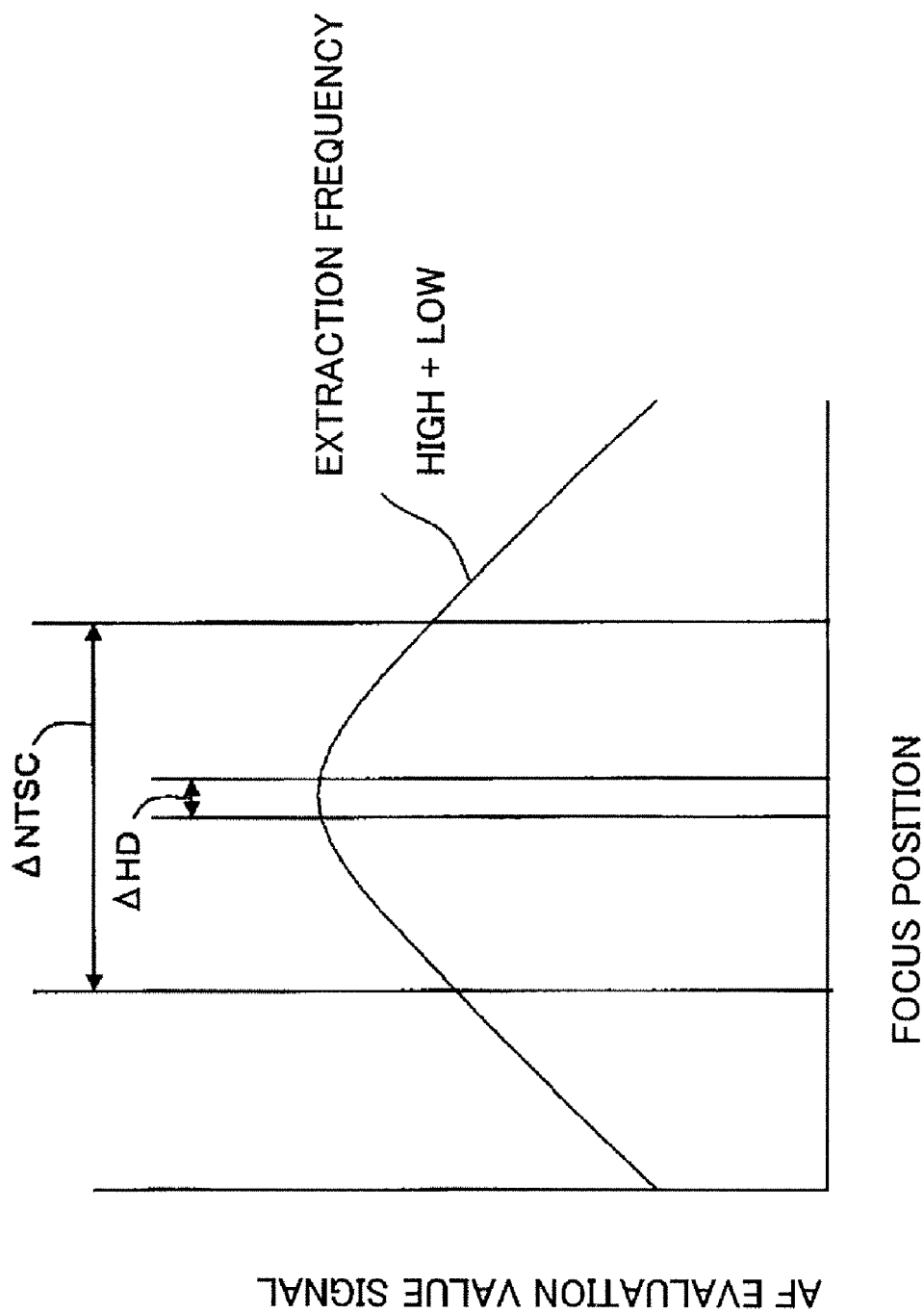
FIG. 11C is a graph showing a synthesis signal formed by adding the AF evaluation value signal in the high frequency band and the AF evaluation value signal in the low frequency band.

FIG. 10B is a flow chart showing the basic concept of the setting of the extraction frequency bands for the AF evaluation value signal and the gains in Embodiment 3.

At step S1001, it is determined whether or not an in-focus determination operation is being made. If the in-focus determination operation is not being made, the flow proceeds to step S1002. If the in-focus determination operation is being made, the flow proceeds to step S1005.

At step S1002, the state of the image-pickup system selecting switch 40 is read to determine whether the standard TV system or the high-definition system is selected. If the standard TV system is selected, the flow proceeds to step S1003 to set the extraction frequency bands and the gains for providing the first synthesis AF evaluation value signal suitable for the standard TV system. If the high-definition system is selected, the flow proceeds to step S1004 to set the extraction frequency bands and the gains for providing the first synthesis AF evaluation value signal. This enables detection of a major subject using the first synthesis AF evaluation value signal by the time the in-focus determination operation is made in the high-definition image pickup.

At step S1005, the state of the image-pickup system selecting switch 40 is read to determine whether the standard TV system or the high-definition system is selected. If the standard TV system is selected, the flow proceeds to step S1006 to set the extraction frequency bands and the gains for providing the first synthesis AF evaluation value signal suitable for the standard TV system. If the high-definition system is selected, the flow proceeds to step S1007 to set the extraction frequency bands and the gains for providing the second synthesis AF evaluation value signal suitable for the high-definition system.

The extraction frequency bands and the gains for providing the first synthesis AF evaluation value signals at steps S1003 and S1004 may or may not be the same. Optimal setting can be performed depending on the image-pickup system to improve the responsiveness and in-focus accuracy in each of the image-pickup systems.

The extraction frequency bands and the gains for providing the first synthesis AF evaluation value signal at steps S1003 and S1006 may or may not be different from each other. This is because the bandwidth in the standard TV system is smaller than that in the high-definition system and thus desired performance is often ensured in the standard TV system without using different settings before and during the in-focus determination operation. Since a large relative change is not needed in the frequency bands in the standard TV system as compared with the high-definition system, the same setting may be used before and during the in-focus determination operation.

Next, the minute-drive control in Embodiment 3 will be described in detail with reference to the flow chart in FIG. 7. The general flow of AF control including the minute-drive control is identical to the flow shown in the flow chart of FIG. 6.

In FIG. 7, at step S700, the extraction frequency bands and the gains for generating the first synthesis AF evaluation value signal containing AF evaluation value signal components in the high frequency band at a low ratio are set on the basis of the state of the image-pickup system selecting switch 40 (the standard TV system or the high-definition system). For example, the setting is made as follows:
Standard TV System
BPF0: Frequency Band 0.5 MHz, Gain 100%
BPF1: Frequency Band 2 MHz, Gain 100%
BPF2: Frequency Band 5 MHz, Gain 10%
High-Definition System
BPF0: Frequency Band 0.5 MHz, Gain 100%
BPF1: Frequency Band 2 MHz, Gain 100%
BPF2: Frequency Band 5 MHz, Gain 10%

As described above, different settings may be made between the standard TV system and the high-definition system at step S700 as below. For example, in the standard TV system, the AF evaluation value signals in the lower frequency bands than in the high-definition system are used to have balance as a whole.
Standard TV System
BPF0: Frequency Band 0.5 MHz, Gain 100%
BPF1: Frequency Band 1.5 MHz, Gain 100%
BPF2: Frequency Band 3 MHz, Gain 5%
High-Definition System
BPF0: Frequency Band 0.5 MHz, Gain 100%
BPF1: Frequency Band 2 MHz, Gain 100%
BPF2: Frequency Band 5 MHz, Gain 10%

The operations from S701 to S704 and S706 are performed similarly to those described in Embodiment 1.

When the flow proceeds from step S704 to S705, the in-focus determination operation is started at step S705. In the high-definition system, the settings of the extraction frequency bands and the gains are changed to generate the second synthesis AF evaluation value signal containing AF evaluation value signal components in the high frequency band at a high ratio. On the other hand, in the standard TV system, the extraction frequency bands and the gains are not changed. For example, the setting is made as follows:
Standard TV System
BPF0: Frequency Band 0.5 MHz, Gain 100%
BPF1: Frequency Band 2 MHz, Gain 100%
BPF2: Frequency Band 5 MHz, Gain 10%
High-Definition System
BPF0: Frequency Band 0.5 MHz, Gain 100%
BPF1: Frequency Band 2 MHz, Gain 100%
BPF2: Frequency Band 5 MHz, Gain 100%

As described above, in the in-focus determination operation at step S705 and afterward, the settings may be changed in the standard TV system. However, the change is limited to the first synthesis AF evaluation value signal containing AF evaluation value signal components in the high frequency band at a low ratio. Specifically, the setting may be made as follows:
Standard TV System
BPF0: Frequency Band 0.5 MHz, Gain 100%
BPF1: Frequency Band 1.5 MHz, Gain 100%
BPF2: Frequency Band 3 MHz, Gain 5%
High-Definition System
BPF0: Frequency Band 0.5 MHz, Gain 100%
BPF1: Frequency Band 2 MHz, Gain 100%
BPF2: Frequency Band 5 MHz, Gain 100%

At step S707, it is determined whether or not to-and-fro movement of the focus lens 18 is repeated a predetermined number of times in the same area. If the to-and-fro movement is repeated the predetermined number of times, the flow proceeds to step S708. If it is determined that the to-and-fro movement is not repeated the predetermined number of times, the flow proceeds to step S710.

At step S708, since the in-focus determination is made, a flag indicating that is set and the focus lens 18 is moved to the peak position within the abovementioned to-and-fro movement area (the peak position 1 in the standard TV system or the peak position 2 in the high-definition system). The flag is used in the determination at step S602 in FIG. 6. Then, the flow proceeds to step S710.

At step S710, the settings of the extraction frequency bands and the gains are returned as below and the processing is ended.
Standard TV System
BPF0: Frequency Band 0.5 MHz, Gain 100%
BPF1: Frequency Band 2 MHz, Gain 100%
BPF2: Frequency Band 5 MHz, Gain 10% (or 5%)
High-Definition System
BPF0: Frequency Band 0.5 MHz, Gain 100%
BPF1: Frequency Band 2 MHz, Gain 100%
BPF2: Frequency Band 5 MHz, Gain 10%

According to Embodiment 3, the extraction frequencies and the gains can be set differently for the standard TV system and the high-definition system to realize AF control with high performance appropriate for each of the image-pickup systems.

The settings of the frequency bands for the AF evaluation value signals and the gains shown in Embodiment 3 are merely illustrative, and they may be set as illustrated in setting examples 1 to 7 described in Embodiment 1.

Embodiment 4

Embodiment 4 of the present invention will hereinafter be described. The basic structure of an image-pickup apparatus in Embodiment 4 is identical to the structure of the image-pickup apparatus in Embodiment 3 shown in FIG. 9. Thus, components identical to those in Embodiment 3 are designated with the same reference numerals as those in Embodiment 3.

In Embodiment 4, when the standard TV system is selected, a main control circuit 30 sets extraction frequency bands and gains for providing an AF evaluation value signal (first synthesis AF evaluation value signal) appropriate for the standard TV system. The first synthesis AF evaluation value signal is used to perform operation and in-focus determination in the first step and in-focus determination in the second step of AF control.

On the other hand, when the high-definition system is selected, as described in Embodiment 2, the first synthesis AF evaluation value signal is first used to perform operation and in-focus determination in the first step. Then, extraction frequency bands and gains for providing an AF evaluation value signal (second synthesis AF evaluation value signal) appropriate for the high-definition system are set, and the second synthesis AF evaluation value signal is used to perform in-focus determination in the second step.

The basic concept of the setting of the extraction frequency bands for the AF evaluation value signal and the gains in Embodiment 4 is similar to that shown in FIG. 10B in Embodiment 3. However, at step S1001, it is determined whether or not the in-focus determination operation in the second step is being made.

Next, minute-drive control in Embodiment 4 will be described in detail with reference to the flow chart in FIG. 8. The general flow of AF control including the minute-drive control is identical to the flow shown in the flow chart of FIG. 6.

In FIG. 8, at step S800, extraction frequency bands and gains for generating the first synthesis AF evaluation value signal containing AF evaluation value signal components in the high frequency band at a low ratio are set on the basis of the state of an image-pickup system selecting switch 40 (the standard TV system or the high-definition system). For example, the setting is made as follows:

Standard TV System
BPF0: Frequency Band 0.5 MHz, Gain 100%
BPF1: Frequency Band 2 MHz, Gain 100%
BPF2: Frequency Band 5 MHz, Gain 10%
High-Definition System
BPF0: Frequency Band 0.5 MHz, Gain 100%
BPF1: Frequency Band 2 MHz, Gain 100%
BPF2: Frequency Band 5 MHz, Gain 10%

Settings for the standard TV system may be different from those for the high-definition system at step S800 as below. For example, in the standard TV system, the AF evaluation value signals in the lower frequency bands than in the high-definition system are used to have balance as a whole.

Standard TV System
BPF0: Frequency Band 0.5 MHz, Gain 100%
BPF1: Frequency Band 1.5 MHz, Gain 100%
BPF2: Frequency Band 3 MHz, Gain 5%
High-Definition System
BPF0: Frequency Band 0.5 MHz, Gain 100%
BPF1: Frequency Band 2 MHz, Gain 100%
BPF2: Frequency Band 5 MHz, Gain 10%

The operations from S801 to S804 and S806 are performed similarly to those described in Embodiment 2.

When the flow proceeds from step S804 to S805, the in-focus determination operation in the first step is started at step S805. In both of the standard TV system and the high-definition system, the settings at step S800 are not changed and the control is performed with the first synthesis AF evaluation value signal to determine whether or not the focus lens 18 continues to-and-fro movement a predetermined number of times in the same area. If the to-and-fro movement is repeated the predetermined number of times, the flow proceeds to step S807. On the other hand, if the to-and-fro movement is not repeated the predetermined number of times, the flow proceeds to step S810.

At step S807, the in-focus determination operation is started in the second step. In the high-definition system, the settings of the extraction frequency bands and the gains are changed to generate the second synthesis AF evaluation value signal containing AF evaluation value signal components in the high frequency band at a high ratio. On the other hand, in the standard TV system, the settings of the extraction frequency bands and the gains are not changed. For example, the setting is made as follows:

Standard TV System
BPF0: Frequency Band 0.5 MHz, Gain 100%
BPF1: Frequency Band 2 MHz, Gain 100%
BPF2: Frequency Band 5 MHz, Gain 10%
High-Definition System
BPF0: Frequency Band 0.5 MHz, Gain 100%
BPF1: Frequency Band 2 MHz, Gain 100%
BPF2: Frequency Band 5 MHz, Gain 100%

As described above, in the in-focus determination operation at step S807 and afterward, the settings may be changed in the standard TV system. However, the change is limited to the first synthesis AF evaluation value signal containing AF evaluation value signal components in the high frequency band at a low ratio. Specifically, the setting may be made as follows:

Standard TV System
BPF0: Frequency Band 0.5 MHz, Gain 100%
BPF1: Frequency Band 1.5 MHz, Gain 100%
BPF2: Frequency Band 3 MHz, Gain 5%
High-Definition System
BPF0: Frequency Band 0.5 MHz, Gain 100%
BPF1: Frequency Band 2 MHz, Gain 100%
BPF2: Frequency Band 5 MHz, Gain 100%

Next, at step S808, it is determined whether or not the focus lens 18 continues to-and-fro movement a predetermined number of times in the same area. If the to-and-fro movement is repeated the predetermined number of times, the flow proceeds to step S809. On the other hand, if the to-and-fro movement is not repeated the predetermined number of times, the flow proceeds to step S810.

At step S809, since the in-focus determination is made, a flag indicating that is set and the focus lens 18 is moved to the peak position within the abovementioned to-and-fro movement area (the peak position 1 in the standard TV system or the peak position 2 in the high-definition system). The flag is used in the determination at step S602 in FIG. 6. Then, the flow proceeds to step S810.

At step S810, the settings of the extraction frequency bands and the gains are returned as below and the processing is ended.

Standard TV System
BPF0: Frequency Band 0.5 MHz, Gain 100%
BPF1: Frequency Band 2 MHz, Gain 100%

BPF2: Frequency Band 5 MHz, Gain 10% (or 5%)
High-Definition System
BPF0: Frequency Band 0.5 MHz, Gain 100%
BPF1: Frequency Band 2 MHz, Gain 100%
BPF2: Frequency Band 5 MHz, Gain 10%

According to Embodiment 4, the extraction frequencies and the gains can be set differently for the standard TV system and the high-definition system to realize AF control with high performance appropriate for each of the image-pickup systems. In addition, especially in the high-definition image pickup, the in-focus determination can be made by using the first synthesis AF evaluation value signal to detect the major subject more reliably than in Embodiment 3. The in-focus determination can be made again by using the second synthesis AF evaluation value signal to achieve highly accurate focusing on the major subject. This can improve the responsiveness in the AF control and the in-focus accuracy.

The settings of the frequency bands for the AF evaluation value signals and the gains shown in Embodiment 4 are merely illustrative, and they may be set as illustrated in the setting examples 1 to 7 described in Embodiment 1.

According to each of above-described Embodiments 1 to 4, the focus control for the major subject is performed by using the first focus signal containing the focus signal component in the relatively high or the highest frequency band at a low ratio, and the focus accuracy is further increased by using the second focus signal containing the focus signal component in the relatively high or the highest frequency band at a high ratio. As a result, when images are picked up with a higher resolution than in conventional images, not only high focusing accuracy but also favorable responsiveness in the focus control can be provided.

The AF control in each of Embodiments 1 to 4 described above is also realized by forming the main control circuit 30 and the AF evaluation value processing circuit 28 with a computer and executing a computer program (software) stored in the computer. Specifically, it is possible to use software for performing the step of generating the AF evaluation value signal components in the plurality of frequency bands based on the signal from the image-pickup part and the step of controlling the drive of the focus lens 18 such that the level of the synthesis AF evaluation value signal approaches the highest value. In the control step, the software performs the operation of the first step of the AF control with the first synthesis AF evaluation value signal and then performs the operation of the second step with the second synthesis AF evaluation value signal.

While each of Embodiments 1 to 4 explained above has been described in conjunction with the video camera or the digital still camera integral with the lens, the present invention is applicable to a video camera or a digital still camera with an interchangeable lens. The present invention is also applicable to an interchangeable lens apparatus which takes a signal generated by an image-pickup part from a camera body, generates an AF evaluation value signal from that signal, and performs AF control with the signal.

The first focus signal referred to in the present invention may be generated by using a signal in one of a plurality of frequency bands extracted from an output from the image-pickup part.

Furthermore, the present invention is not limited to these preferred embodiments and various variations and modifications may be made without departing from the scope of the present invention.

This application claims foreign priority benefits based on Japanese Patent Application No. 2005-341922, filed on Nov. 28, 2005, which is hereby incorporated by reference herein in its entirety as if fully set forth herein.

What is claimed is:

1. An optical apparatus comprising:
a signal generator which extracts signals in a plurality of frequency bands from an output from an image-pickup part and generates focus signals from the extracted signals; and
a controller which performs auto-focus control such that each of the focus signals approaches the highest value;
wherein the controller uses a first focus signal and a second focus signal in the auto-focus control;
wherein each of the first focus signal and the second focus signal is a synthesis signal formed by synthesizing at least two of a focus signal in a first frequency band and a focus signal in a second frequency band lower than the first frequency band;
wherein a ratio of the focus signal in the first frequency band synthesized in the second focus signal to the entire second focus signal is higher than a ratio of the focus signal in the first frequency band synthesized in the first focus signal to the entire first focus signal;
wherein the controller performs, when a resolution of an image signal obtained by the image-pickup part is a first resolution, the auto-focus control with the first focus signal;
wherein the controller performs, when the resolution of the image signal is a second resolution higher than the first resolution, the auto-focus control with the first focus signal and then performs the auto-focus control with the second focus signal;
wherein, when synthesizing the focus signals in the first and second frequency bands, the controller multiplies each of the focus signals in the first and second frequency bands by a gain and adds the resulting focus signals in the first and second frequency bands after the gain multiplication to change a ratio of the focus signals in the first and second frequency bands in each of the first and second focus signals; and
wherein the gain for the focus signal in the first frequency band in the second focus signal is higher than the gain for the focus signal in the first frequency band in the first focus signal.

2. An optical apparatus comprising:
a signal generator which extracts signals in a plurality of frequency bands from an output from an image-pickup part and generates focus signals from the extracted signals; and
a controller which performs auto-focus control such that each of the focus signals approaches the highest value;
wherein the controller uses a first focus signal and a second focus signal in the auto-focus control;
wherein each of the first focus signal and the second focus signal is a synthesis signal formed by synthesizing at least two of a focus signal in a first frequency band and a focus signal in a second frequency band lower than the first frequency band;
wherein a ratio of the focus signal in the first frequency band synthesized in the second focus signal to the entire second focus signal is higher than a ratio of the focus signal in the first frequency band synthesized in the first focus signal to the entire first focus signal;
wherein the controller performs, when a resolution of an image signal obtained by the image-pickup part is a first resolution, the auto-focus control with the first focus signal;

wherein the controller performs, when the resolution of the image signal is a second resolution higher than the first resolution, the auto-focus control with the first focus signal and then performs the auto-focus control with the second focus signal; and wherein the controller is capable of changing a ratio of the focus signals in the first and second frequency bands in each of the first and second focus signals.

3. An optical apparatus comprising:

a signal generator which extracts signals in a plurality of frequency bands from an output from an image-pickup part and generates focus signals from the extracted signals; and a controller which performs auto-focus control such that each of the focus signals approaches the highest value;

wherein the controller uses a first focus signal and a second focus signal in the auto-focus control;

wherein the second focus signal is a synthesis signal formed by synthesizing at least two of a focus signal in a first frequency band and a focus signal in a second frequency band lower than the first frequency band, and the first focus signal is a synthesis signal formed by synthesizing focus signals in plural frequency bands;

wherein a ratio of the focus signal in the first frequency band synthesized in the second focus signal to the entire second focus signal is higher than that a ratio of the focus signal in the first frequency band in the first focus signal to the entire first focus signal;

wherein the controller performs, when a resolution of an image signal obtained by the image-pickup part is a first resolution, the auto-focus control with the first focus signal;

wherein the controller performs, when the resolution of the image signal is a second resolution higher than the first resolution, the auto-focus control with the first focus signal and then performs the auto-focus control with the second focus signal, and wherein the first focus signal does not contain the focus signal in the first frequency band.

4. The optical apparatus according to claim 3, wherein the first frequency band in the first focus signal is different from that in the second focus signal.

5. An optical apparatus comprising:

a signal generator which extracts signals in a plurality of frequency bands from an output from an image-pickup part and generates focus signals from the extracted signals; and a controller which performs auto-focus control such that each of the focus signals approaches the highest value;

wherein the controller uses a first focus signal and a second focus signal in the auto-focus control; and wherein the second focus signal is a synthesis signal formed by synthesizing at least two of a focus signal in a first frequency band and a focus signal in a second frequency band lower than the first frequency band, and the first focus signal is a synthesis signal formed by synthesizing focus signals in plural frequency bands;

wherein a ratio of the focus signal in the first frequency band synthesized in the second focus signal to the entire second focus signal is higher than that a ratio of the focus signal in the first frequency band in the first focus signal to the entire first focus signal;

wherein the controller performs, when a resolution of an image signal obtained by the image-pickup part is a first resolution, the auto-focus control with the first focus signal;

wherein the controller performs, when the resolution of the image signal is a second resolution higher than the first resolution, the auto-focus control with the first focus signal and then performs the auto-focus control with the second focus signal; and wherein the controller is capable of changing a ratio of the focus signals in the first and second frequency bands in the second focus signal.

\* \* \* \* \*